United States Patent
Nishio

(10) Patent No.: US 9,323,444 B2
(45) Date of Patent: Apr. 26, 2016

(54) DEVICE, METHOD, AND STORAGE MEDIUM STORING PROGRAM

(71) Applicant: KYOCERA CORPORATION, Kyoto-shi, Kyoto (JP)

(72) Inventor: Sanae Nishio, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 113 days.

(21) Appl. No.: 13/727,940

(22) Filed: Dec. 27, 2012

(65) Prior Publication Data

US 2013/0169573 A1  Jul. 4, 2013

(30) Foreign Application Priority Data

Dec. 28, 2011 (JP) ................. 2011-289361

(51) Int. Cl.
*G06F 3/0488* (2013.01)
*H04M 1/66* (2006.01)

(52) U.S. Cl.
CPC .......... *G06F 3/0488* (2013.01); *G06F 3/04883* (2013.01); *H04M 1/66* (2013.01); *H04M 2250/22* (2013.01)

(58) Field of Classification Search
CPC combination set(s) only.
See application file for complete search history.

(56) References Cited

U.S. PATENT DOCUMENTS

| | | | |
|---|---|---|---|
| 7,657,849 B2 | 2/2010 | Chaudhri et al. | |
| 8,046,721 B2 | 10/2011 | Chaudhri et al. | |
| 8,209,637 B2 | 6/2012 | Chaudhri et al. | |
| 8,286,103 B2 | 10/2012 | Chaudhri et al. | |
| 8,519,963 B2 * | 8/2013 | Kocienda et al. | ............. 345/173 |
| 8,527,903 B2 | 9/2013 | Chaudhri et al. | |
| 8,627,237 B2 | 1/2014 | Chaudhri et al. | |
| 8,640,057 B2 | 1/2014 | Chaudhri et al. | |
| 8,694,923 B2 | 4/2014 | Chaudhri et al. | |
| 8,745,544 B2 | 6/2014 | Chaudhri et al. | |
| 2007/0150842 A1 * | 6/2007 | Chaudhri | ............ G06F 3/04883 715/863 |
| 2008/0165160 A1 | 7/2008 | Kocienda et al. | |
| 2010/0240415 A1 * | 9/2010 | Kim | .................... G06F 3/03547 455/565 |
| 2012/0009896 A1 * | 1/2012 | Bandyopadhyay | ... G06F 1/1643 455/411 |
| 2012/0159386 A1 * | 6/2012 | Kang et al. | ..................... 715/800 |
| 2013/0265267 A1 * | 10/2013 | Victor | ........................... 345/173 |
| 2013/0285925 A1 * | 10/2013 | Stokes et al. | .................. 345/173 |
| 2013/0300689 A1 * | 11/2013 | Park | ............................ 345/173 |
| 2013/0314341 A1 * | 11/2013 | Lee | ....................... G06F 3/0488 345/173 |
| 2014/0035853 A1 * | 2/2014 | Ok et al. | ....................... 345/173 |

(Continued)

FOREIGN PATENT DOCUMENTS

| | | | |
|---|---|---|---|
| JP | 2009-521753 | A | 6/2009 |
| WO | 2008086302 | A1 | 7/2008 |
| WO | 2011/077525 | A1 | 6/2011 |

OTHER PUBLICATIONS

Office Action mailed Feb. 24, 2015, corresponding to Japanese patent application No. 2011-289361, for which an explanation of relevance is attached.

(Continued)

*Primary Examiner* — Jason Olson
*Assistant Examiner* — Deeprose Subedi
(74) *Attorney, Agent, or Firm* — Hauptman Ham, LLP

(57) ABSTRACT

According to an aspect, a device includes a touch screen display and a controller. The touch screen display displays a lock screen. When a gesture to change a distance between a first touch and a second touch on the touch screen display is detected during display of the lock screen in a locked state, the controller for releases the locked state.

14 Claims, 19 Drawing Sheets

(56) References Cited

U.S. PATENT DOCUMENTS

| | | | |
|---|---|---|---|
| 2014/0055395 A1* | 2/2014 | Kim | 345/173 |
| 2014/0062931 A1* | 3/2014 | Park | 345/173 |
| 2014/0145994 A1* | 5/2014 | Burrough et al. | 345/173 |

OTHER PUBLICATIONS

Office Action mailed Feb. 24, 2015, corresponding to Japanese patent application No. 2011-289361.

* cited by examiner

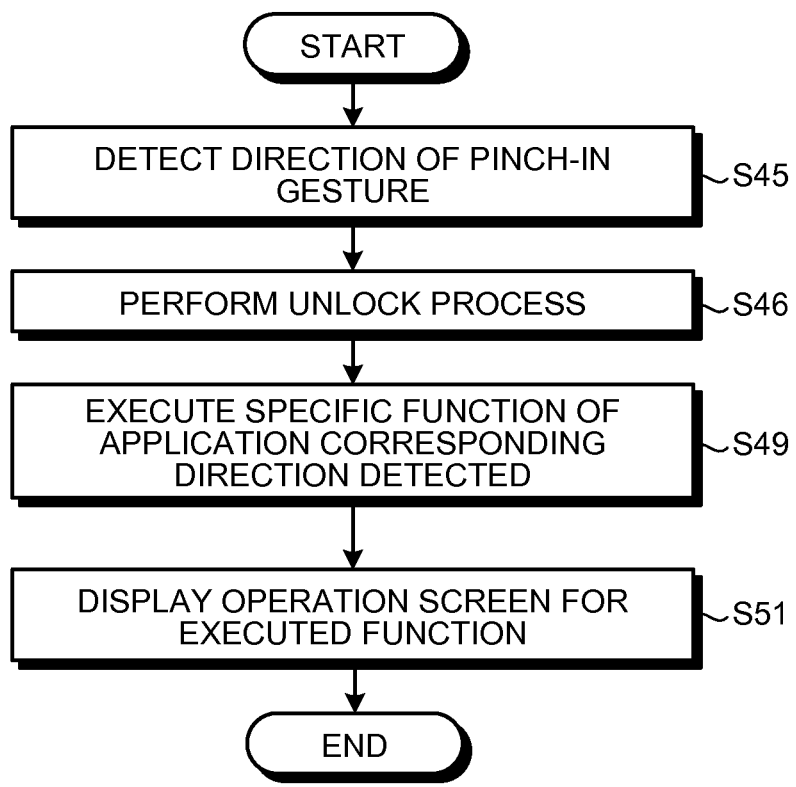

DEVICE, METHOD, AND STORAGE MEDIUM STORING PROGRAM

CROSS-REFERENCE TO RELATED APPLICATIONS

This application claims priority from Japanese Application No. 2011-289361, filed on Dec. 28, 2011, the content of which is incorporated by reference herein in its entirety.

BACKGROUND

1. Technical Field

The present application relates to a device, a method, and a storage medium storing therein a program. More particularly, the present application relates to a device including a touch screen, a method of controlling the device, and a storage medium storing therein a program for controlling the device.

2. Description of the Related Art

A touch screen device having a touch screen has been known. Examples of the touch screen devices include, but are not limited to, a smartphone and a tablet. The touch screen device detects a gesture of a finger, a pen, or a stylus pen through the touch screen. Then, the touch screen device operates according to the detected gesture. An example of the operation according to the detected gesture is described in, for example, International Publication Pamphlet No. 2008/086302.

The basic operation of the touch screen device is implemented by an operating system (OS) built into the device. Examples of the OS built into the touch screen device include, but are not limited to, Android, BlackBerry OS, iOS, Symbian OS, and Windows Phone.

Many of touch screen devices change to a locked state when a time period during which a touch screen device is not operated by a user lasts for a period of time. In the locked state, the touch screen device does not accept any operation from the user except for a specific operation. The specific operation is, for example, an unlock operation for releasing the locked state.

By reason of the above, the touch screen device frequently changes to the locked state, and therefore the user performs the unlock operation frequently. For these reasons, there is a need for a device, a method, and a program capable of improving operability of the unlock operation.

SUMMARY

According to an aspect, a device includes a touch screen display and a controller. The touch screen display displays a lock screen. When a gesture to change a distance between a first touch and a second touch on the touch screen display is detected during display of the lock screen in a locked state, the controller for releases the locked state.

According to another aspect, a method is for controlling a device with a touch screen display. The method includes: displaying a lock screen on the touch screen display; detecting a gesture to change a distance between a first touch and a second touch on the touch screen display during display of the lock screen in a locked state; and upon the detecting, releasing the locked state.

According to another aspect, a non-transitory storage medium stores a program. When executed by a device with a touch screen display, the program causes the device to execute: displaying a lock screen on the touch screen display; detecting a gesture to change a distance between a first touch and a second touch on the touch screen display during display of the lock screen in a locked state; and upon the detecting, releasing the locked state.

BRIEF DESCRIPTION OF THE DRAWINGS

FIG. 20 is a flowchart illustrating another example of the procedure for the control executed in the locked state.

DETAILED DESCRIPTION

Exemplary embodiments of the present invention will be explained in detail below with reference to the accompanying drawings. A smartphone will be explained below as an example of a device including a touch screen.

Figure 1:
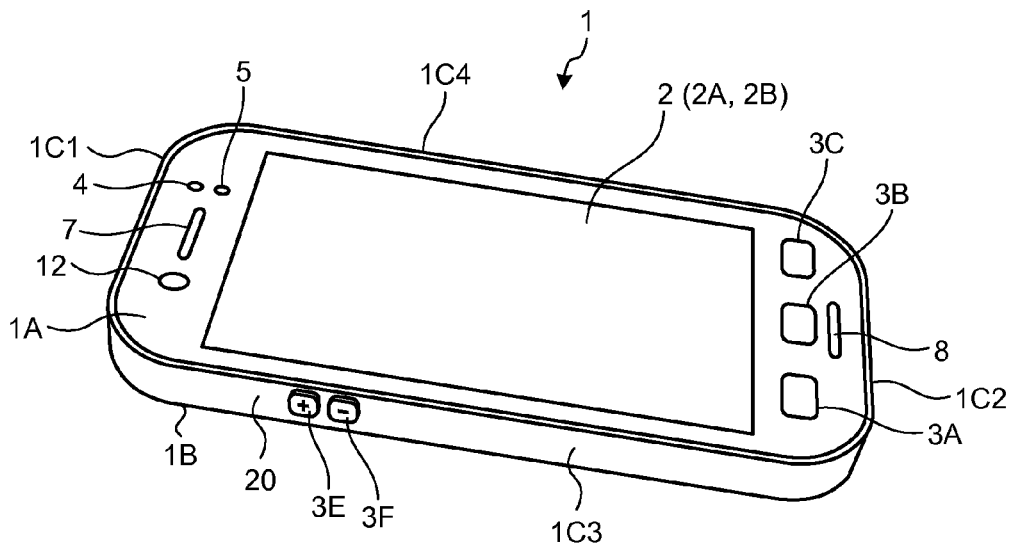
FIG. 1 is a perspective view of a smartphone according to an embodiment.
Figure 2:
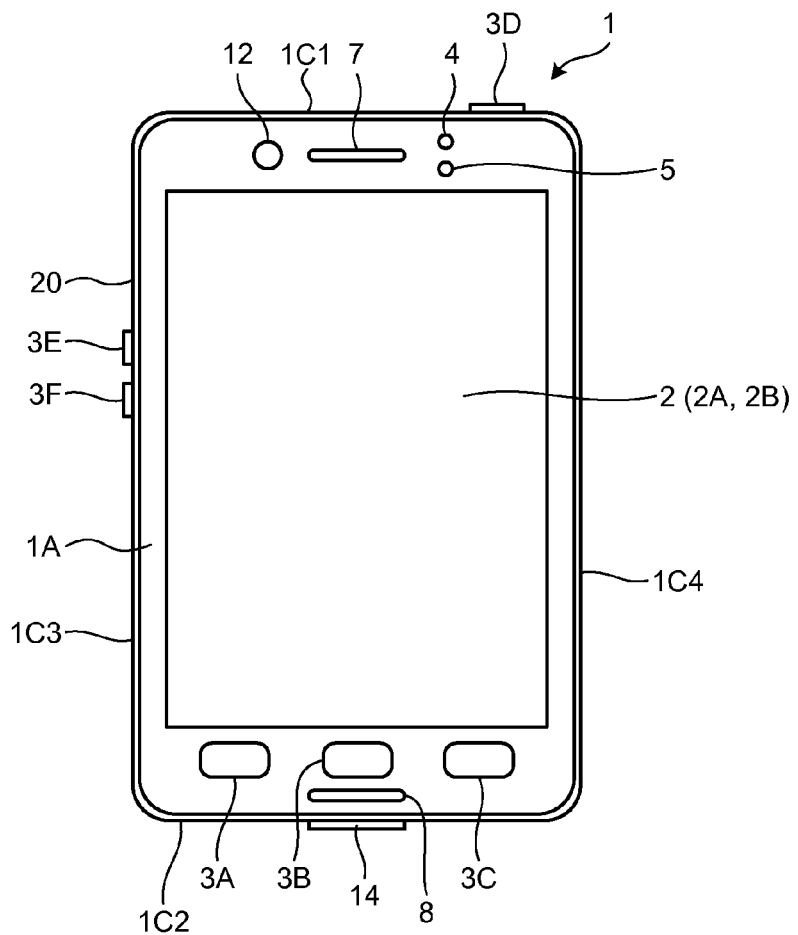
FIG. 2 is a front view of the smartphone.
Figure 3:
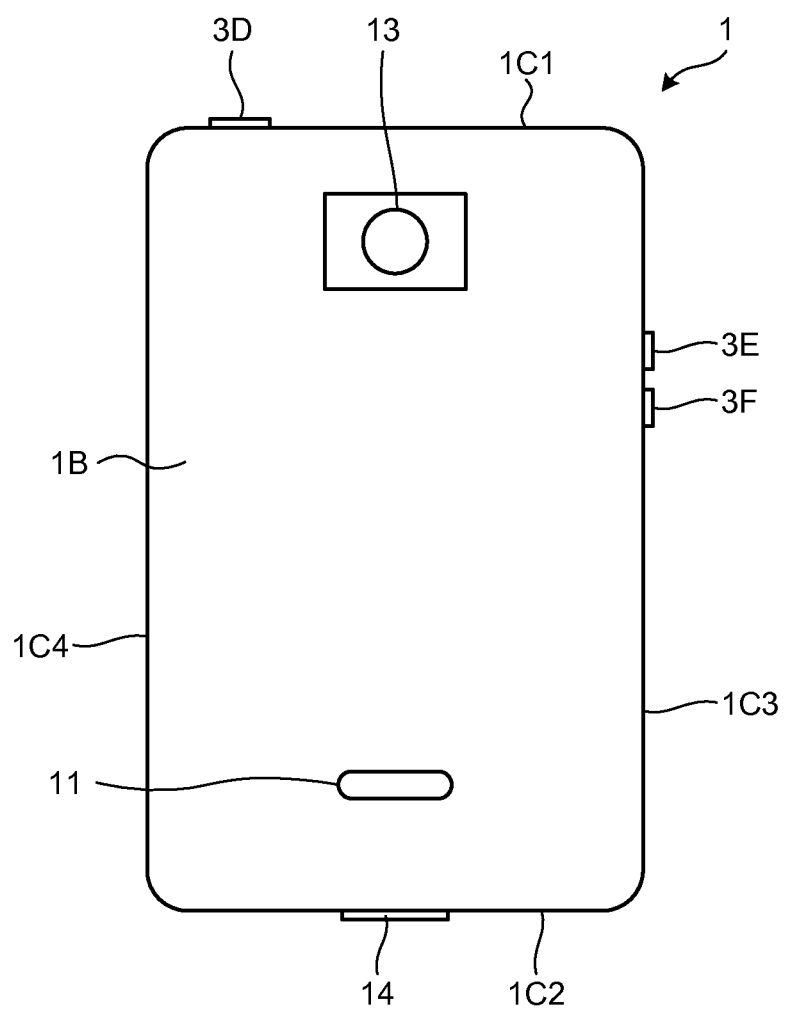
FIG. 3 is a back view of the smartphone.

An overall configuration of a smartphone 1 according to an embodiment will be explained below with reference to FIG. 1 to FIG. 3. As illustrated in FIG. 1 to FIG. 3, the smartphone 1 includes a housing 20. The housing 20 includes a front face 1A, a back face 1B, and side faces 1C1 to 1C4. The front face 1A is a front of the housing 20. The back face 1B is a back of the housing 20. The side faces 1C1 to 1C4 are sides each connecting the front face 1A and the back face 1B. Hereinafter, the side faces 1C1 to 1C4 may be collectively called "side face 1C" without being specific to any of the side faces.

The smartphone 1 includes a touch screen display 2, buttons 3A to 3C, an illumination (ambient light) sensor 4, a proximity sensor 5, a receiver 7, a microphone 8, and a camera 12, which are provided in the front face 1A. The smartphone 1 includes a speaker 11 and a camera 13, which are provided in the back face 1B. The smartphone 1 includes buttons 3D to 3F and a connector 14, which are provided in the side face 1C. Hereinafter, the buttons 3A to 3F may be collectively called "button 3" without being specific to any of the buttons.

The touch screen display 2 includes a display 2A and a touch screen 2B. In the example of FIG. 1, each of the display 2A and the touch screen 2B is approximately rectangular-shaped; however, the shapes of the display 2A and the touch screen 2B are not limited thereto. Each of the display 2A and the touch screen 2B may have any shape such as a square, a circle or the like. In the example of FIG. 1, the display 2A and the touch screen 2B are arranged in a superimposed manner; however, the manner in which the display 2A and the touch screen 2B are arranged is not limited thereto. The display 2A and the touch screen 2B may be arranged, for example, side by side or apart from each other. In the example of FIG. 1, longer sides of the display 2A are along with longer sides of the touch screen 2B respectively while shorter sides of the display 2A are along with shorter sides of the touch screen 2B respectively; however, the manner in which the display 2A and the touch screen 2B are superimposed is not limited thereto. In case the display 2A and the touch screen 2B are arranged in the superimposed manner, they can be arranged such that, for example, one or more sides of the display 2A are not along with any sides of the touch screen 2B.

The display 2A is provided with a display device such as a liquid crystal display (LCD), an organic electro-luminescence display (GELD), or an inorganic electro-luminescence display (IELD). The display 2A displays text, images, symbols, graphics, and the like.

The touch screen 2B detects a contact of a finger, a pen, a stylus pen, or the like on the touch screen 2B. The touch screen 2B can detect positions where a plurality of fingers, pens, stylus pens, or the like make contact with the touch screen 2B.

The detection method of the touch screen 2B may be any detection methods, including but not limited to, a capacitive type detection method, a resistive type detection method, a surface acoustic wave type (or ultrasonic type) detection method, an infrared type detection method, an electro magnetic induction type detection method, and a load sensing type detection method. In the description herein below, for the sake of simplicity, it is assumed that the user uses his/her finger(s) to make contact with the touch screen 2B in order to operate the smartphone 1.

The smartphone 1 determines a type of a gesture based on at least one of a contact detected by the touch screen 2B, a position where the contact is detected, a change of a position where the contact is detected, an interval between detected contacts, and the number of detection times of the contact. The gesture is an operation performed on the touch screen 2B. Examples of the gestures determined by the smartphone 1 include, but are not limited to, touch, long touch, release, swipe, tap, double tap, long tap, drag, flick, pinch in, and pinch out.

"Touch" is a gesture in which a finger makes contact with the touch screen 2B. The smartphone 1 determines a gesture in which the finger makes contact with the touch screen 2B as touch. "Long touch" is a gesture in which a finger makes contact with the touch screen 2B for longer than a given time. The smartphone 1 determines a gesture in which the finger makes contact with the touch screen 2B for longer than a given time as long touch.

"Release" is a gesture in which a finger separates from the touch screen 2B. The smartphone 1 determines a gesture in which the finger separates from the touch screen 2B as release. "Swipe" is a gesture in which a finger moves on the touch screen 2B with continuous contact thereon. The smartphone 1 determines a gesture in which the finger moves on the touch screen 2B with continuous contact thereon as swipe.

"Tap" is a gesture in which a touch is followed by a release. The smartphone 1 determines a gesture in which a touch is followed by a release as tap. "Double tap" is a gesture such that a gesture in which a touch is followed by a release is successively performed twice. The smartphone 1 determines a gesture such that a gesture in which a touch is followed by a release is successively performed twice as double tap.

"Long tap" is a gesture in which a long touch is followed by a release. The smartphone 1 determines a gesture in which a long touch is followed by a release as long tap. "Drag" is a gesture in which a swipe is performed from an area where a movable-object is displayed. The smartphone 1 determines a gesture in which a swipe is performed from an area where the movable-object displayed as drag.

"Flick" is a gesture in which a finger separates from the touch screen 2B while moving after making contact with the touch screen 2B. That is, "Flick" is a gesture in which a touch is followed by a release accompanied with a movement of the finger. The smartphone 1 determines a gesture in which the finger separates from the touch screen 2B while moving after making contact with the touch screen 2B as flick. The flick is performed, in many cases, with a finger moving along one direction. The flick includes "upward flick" in which the finger moves upward on the screen, "downward flick" in which the finger moves downward on the screen, "rightward flick" in which the finger moves rightward on the screen, and "leftward flick" in which the finger moves leftward on the screen, and the like. Movement of the finger during the flick is, in many cases, quicker than that of the finger during the swipe.

"Pinch in" is a gesture in which a swipe with a plurality of fingers is performed in a direction to move the fingers toward each other. The smartphone 1 determines a gesture in which the distance between a position of one finger and a position of another finger detected by the touch screen 2B becomes shorter as pinch in. "Pinch out" is a gesture in which a swipe with a plurality of fingers is performed in a direction to move the fingers away from each other. The smartphone 1 determines a gesture in which the distance between a position of one finger and a position of another finger detected by the touch screen 2B becomes longer as pinch out.

In the description herein below, a gesture performed by using a finger may be referred to as a "single touch gesture", and a gesture performed by using a plurality of fingers may be referred to as a "multi touch gesture". Examples of the multi touch gesture include a pinch in and a pinch out. A tap, a flick, a swipe, and the like are a single touch gesture when performed by using a finger, and are a multi touch gesture when performed by using a plurality of fingers.

The smartphone 1 performs operations according to these gestures which are determined through the touch screen 2B. Therefore, user-friendly and intuitive operability is achieved. The operations performed by the smartphone 1 according to the determined gestures may be different depending on the screen displayed on the display 2A. In the following explanation, for the sake of simplicity of explanation, the fact that the touch screen detects the contact(s) and then the smartphone determines the type of the gesture as X based on the contact(s) may be simply described as "the smartphone detects X" or "the controller detects X".

Figure 4:
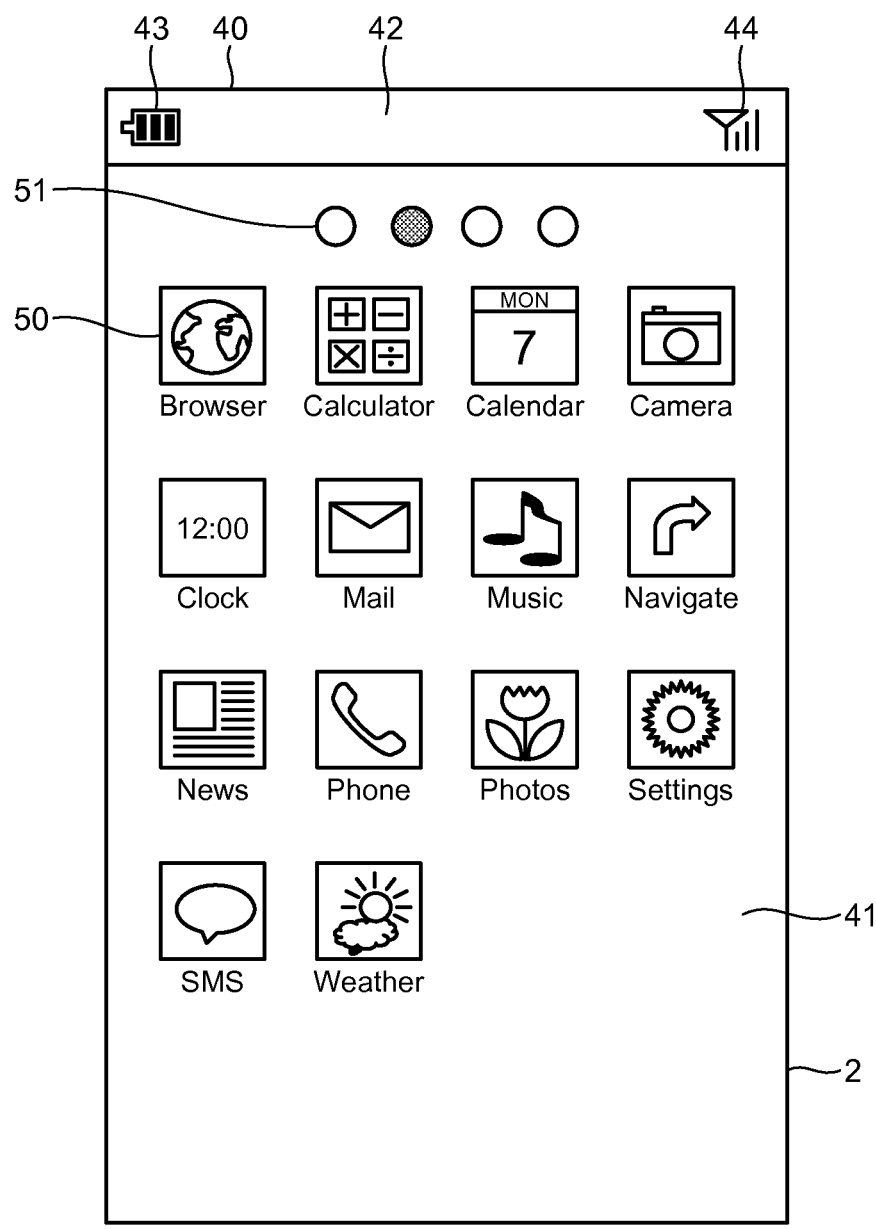
FIG. 4 is a diagram illustrating an example of a home screen.

An example of the screen displayed on the display 2A will be explained below with reference to FIG. 4. FIG. 4 represents an example of a home screen. The home screen may also be called "desktop", "standby screen", "idle screen", or "standard screen". The home screen is displayed on the display 2A.

The home screen is a screen allowing the user to select which one of applications (programs) installed in the smartphone 1 is executed. The smartphone 1 executes the application selected on the home screen in the foreground. The screen of the application executed in the foreground is displayed on the display 2A.

Icons can be arranged on the home screen of the smartphone 1. A plurality of icons 50 are arranged on a home screen 40 illustrated in FIG. 4. Each of the icons 50 is previously associated with an application installed in the smartphone 1. When detecting a gesture for an icon 50, the smartphone 1 executes the application associated with the icon 50 for which the gesture is detected. For example, when detecting a tap on an icon 50 associated with a mail application, the smartphone 1 executes the mail application.

The icons 50 include an image and a character string. The icons 50 may contain a symbol or a graphic instead of an image. The icons 50 do not have to include either one of the image and the character string. The icons 50 are arranged based on a layout pattern. A wall paper 41 is displayed behind the icons 50. The wall paper may sometimes be called "photo screen", "back screen", "idle image", or "background image". The smartphone 1 can use an arbitrary image as the wall paper 41. The smartphone 1 may be configured so that the user can select an image to be displayed as the wall paper 41.

The smartphone 1 can include a plurality of home screens. The smartphone 1 determines, for example, the number of home screens according to setting by the user. The smartphone 1 displays a selected one on the display 2A even when there is a plurality of home screens.

The smartphone 1 displays an indicator (a locator) 51 on the home screen. The indicator 51 includes one or more symbols. The number of the symbols is the same as that of the home screens. In the indicator 51, a symbol corresponding to a home screen that is currently displayed is displayed in a different manner from that of symbols corresponding to the other home screens.

The indicator 51 in an example illustrated in FIG. 4 includes four symbols. This means the number of home screens is four. According to the indicator 51 in the example illustrated in FIG. 4, the second symbol from the left is displayed in a different manner from that of the other symbols. This means that the second home screen from the left is currently displayed.

The smartphone 1 can change a home screen to be displayed on the display 2A. When a gesture is detected while displaying one of home screens, the smartphone 1 changes the home screen to be displayed on the display 2A to another one. For example, when detecting a rightward flick, the smartphone 1 changes the home screen to be displayed on the display 2A to a home screen on the left side. For example, when detecting a leftward flick, the smartphone 1 changes the home screen to be displayed on the display 2A to a home screen on the right side. The smartphone 1 changes the home screen to be displayed on the display 2A from a first home screen to a second home screen, when a gesture is detected while displaying the first home screen, such that the area of the first home screen displayed on the display 2A gradually becomes smaller and the area of the second home screen displayed gradually becomes larger. The smartphone 1 may switch the home screens such that the first home screen is instantly replaced by the second home screen.

An area 42 is provided along the top edge of the display 2A. Displayed on the area 42 are a remaining mark 43 indicating a remaining amount of a power supply and a radio-wave level mark 44 indicating an electric field strength of radio wave for communication. The smartphone 1 may display time, weather, an application during execution thereof, a type of communication system, a status of a phone call, a mode of the device, an event occurring in the device, and the like in the area 42. In this manner, the area 42 is used to inform the user of various notifications. The area 42 may be provided on any screen other than the home screen 40. A position where the area 42 is provided is not limited to the top edge of the display 2A.

The up and down directions of the home screen 40 are directions relative to the up and down directions of a character or image displayed on the display 2A. Therefore, with respect to the home screen 40, a side close to the area 42 in a longitudinal direction of the touch screen display 2 is the top side of the home screen 40, and a side away from the area 42 is the bottom side of the home screen 40. A side where the radio-wave level mark 44 is displayed in the area 42 is the right side of the home screen 40, and a side where the remaining mark 43 is displayed in the area 42 is the left side of the home screen 40. The smartphone 1 determines, for example, left direction, diagonally left upward direction, diagonally right upward direction, right direction, diagonally right downward direction, and diagonally left downward direction of the home screen 40, based on the up and down directions of a character or image displayed on the home screen 40.

The home screen 40 illustrated in FIG. 4 is only an example, and therefore the configuration of each of elements, the arrangement of the elements, the number of home screens 40, the way to perform each of operations on the home screen 40, and the like do not have to be like the above mentioned explanation. A lock screen is also displayed on the display 2A as well as the home screen 40. The details of the lock screen will be described later.

Figure 5:
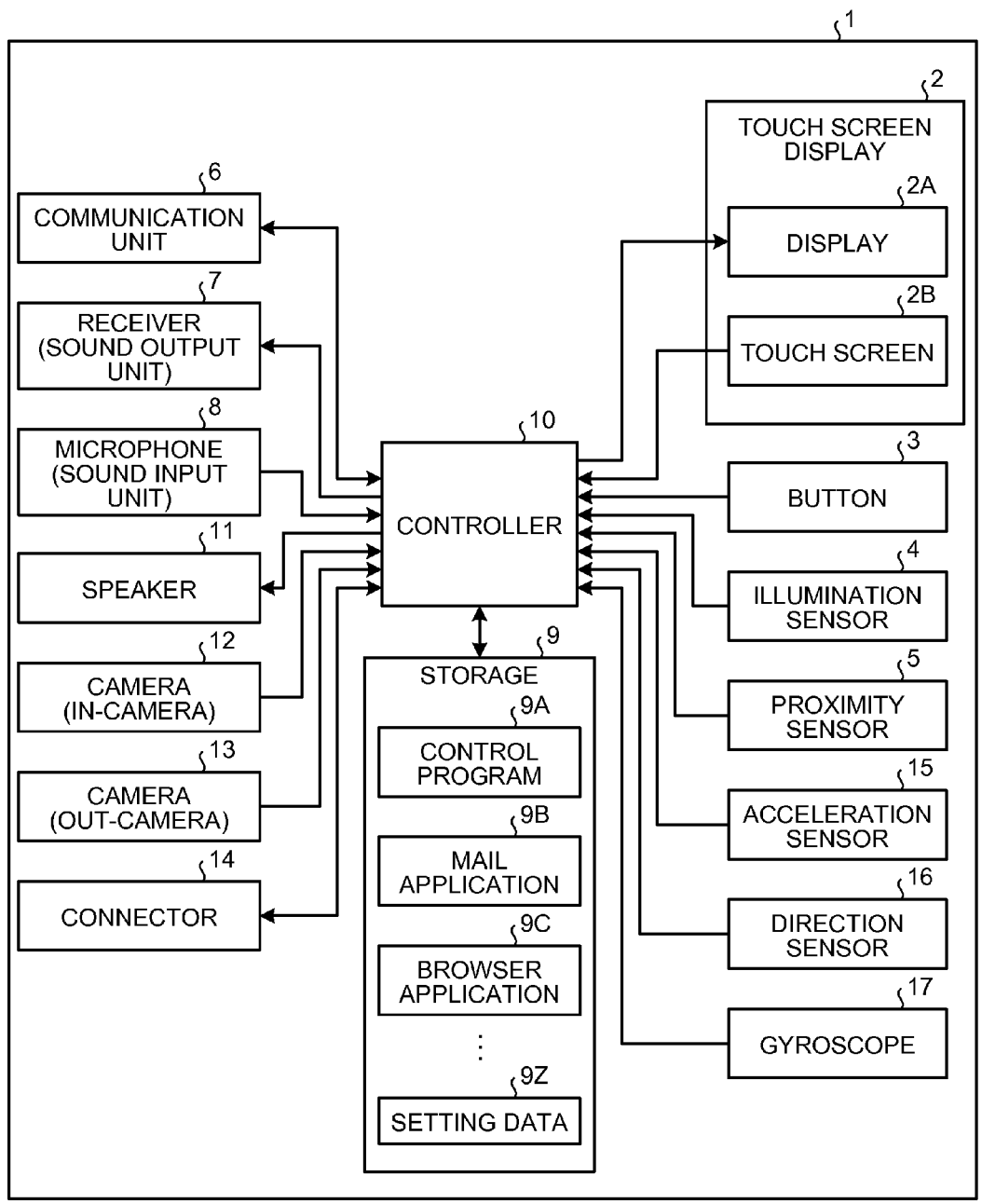
FIG. 5 is a block diagram of the smartphone.

FIG. 5 is a block diagram of the smartphone 1. The smartphone 1 includes the touch screen display 2, the button 3, the illumination sensor 4, the proximity sensor 5, a communication unit 6, the receiver 7, the microphone 8, a storage 9, a controller 10, the speaker 11, the cameras 12 and 13, the connector 14, an acceleration sensor 15, a direction (orientation) sensor 16, and a gyroscope 17.

The touch screen display 2 includes, as explained above, the display 2A and the touch screen 2B. The display 2A displays text, images, symbols, graphics, or the like. The touch screen 2B detects contact(s). The controller 10 detects a gesture performed for the smartphone 1. Specifically, the controller 10 detects an operation (a gesture) for the touch screen 2B in cooperation with the touch screen 2B.

The button 3 is operated by the user. The button 3 includes buttons 3A to 3F. The controller 10 detects an operation for the button 3 in cooperation with the button 3. Examples of the operations for the button 3 include, but are not limited to, a click, a double click, a triple click, a push, and a multi-push.

The buttons 3A to 3C are, for example, a home button, a back button, or a menu button. The button 3D is, for example, a power on/off button of the smartphone 1. The button 3D may function also as a sleep/sleep release button. The buttons 3E and 3F are, for example, volume buttons.

The illumination sensor 4 detects illumination of the ambient light of the smartphone 1. The illumination indicates intensity of light, lightness, or brightness. The illumination sensor 4 is used, for example, to adjust the brightness of the display 2A. The proximity sensor 5 detects the presence of a nearby object without any physical contact. The proximity sensor 5 detects the presence of the object based on a change of the magnetic field, a change of the return time of the reflected ultrasonic wave, etc. The proximity sensor 5 detects that, for example, the touch screen display 2 is brought close to someone's face. The illumination sensor 4 and the proximity sensor 5 may be configured as one sensor. The illumination sensor 4 can be used as a proximity sensor.

The communication unit 6 performs communication via radio waves. A communication system supported by the communication unit 6 is wireless communication standard. The wireless communication standard includes, for example, a communication standard of cellar phones such as 2G, 3G, and 4G. The communication standard of cellar phones includes, for example, Long Term Evolution (LTE), Wideband Code Division Multiple Access (W-CDMA), CDMA 2000, a Personal Digital Cellular (PDC), a Global System for Mobile Communications (GSM), and a Personal Handy-phone System (PHS). The wireless communication standard further includes, for example, Worldwide Interoperability for Microwave Access (WiMAX), IEEE 802.11, Bluetooth, Infrared Data Association (IrDA), and Near Field Communication (NFC). The communication unit 6 may support one or more communication standards.

The receiver 7 and the speaker 11 are sound output units. The receiver 7 and the speaker 11 output a sound signal transmitted from the controller 10 as sound. The receiver 7 is used, for example, to output voice of the other party on the phone. The speaker 11 is used, for example, to output a ring tone and music. Either one of the receiver 7 and the speaker 11 may double as the other function. The microphone 8 is a sound input unit. The microphone 8 converts speech of the user or the like to a sound signal and transmit the converted signal to the controller 10.

The storage 9 stores therein programs and data. The storage 9 is used also as a work area that temporarily stores a processing result of the controller 10. The storage 9 may include any non-transitory storage medium such as a semiconductor storage medium and a magnetic storage medium. The storage 9 may include a plurality type of storage mediums. The storage 9 may include a combination of a portable storage medium such as a memory card, an optical disc, or a magneto-optical disc with a reader of the storage medium. The storage 9 may include a storage device used as a temporary storage area such as Random Access Memory (RAM).

Programs stored in the storage 9 include applications executed in the foreground or the background and a control program for assisting operations of the applications. The application causes the controller 10, for example, to display a screen on the display 2A and perform a process according to a gesture detected through the touch screen 2B. The control program is, for example, an OS. The applications and the control program may be installed in the storage 9 through communication by the communication unit 6 or through a non-transitory storage medium.

The storage 9 stores therein, for example, a control program 9A, a mail application 9B, a browser application 9C, and setting data 9Z. The mail application 9B provides an e-mail function. The e-mail function allows composition, transmission, reception, and display of e-mail, and the like. The browser application 9C provides a WEB browsing function. The WEB browsing function allows display of WEB pages, and edit of a book mark, and the like. The setting data 9Z provides a function for various settings related to the operations of the smartphone 1.

The control program 9A provides a function related to various controls for operating the smartphone 1. The control program 9A controls, for example, the communication unit 6, the receiver 7, and the microphone 8 to make a phone call. The function provided by the control program 9A includes a function for displaying the lock screen and a function for releasing the locked state. The locked state is released when a specific gesture to change a distance between a first touch and a second touch on the touch screen display 2 is detected. The functions provided by the control program 9A can be used in combination with a function provided by the other program such as the mail application 9B.

The controller 10 is a processing unit. Examples of the processing units include, but are not limited to, a Central Processing Unit (CPU), System-on-a-chip (SoC), a Micro Control Unit (MCU), and a Field-Programmable Gate Array (FPGA). The controller 10 integrally controls the operations of the smartphone 1 to implement various functions.

Specifically, the controller 10 executes instructions contained in the program stored in the storage 9 while referring to the data stored in the storage 9 as necessary. The controller 10 controls a function unit according to the data and the instructions to thereby implement the various functions. Examples of the function units include, but are not limited to, the display 2A, the communication unit 6, the receiver 7, and the speaker 11. The controller 10 can change the control of the function unit according to the detection result of a detector. Examples of the detectors include, but are not limited to, the touch screen 2B, the button 3, the illumination sensor 4, the proximity sensor 5, the microphone 8, the camera 12, the camera 13, the acceleration sensor 15, the direction sensor 16, and the gyroscope 17.

The controller 10 executes, for example, the control program 9A to perform various controls, such as a control for releasing the locked state when a specific gesture to change a distance between a first touch and a second touch on the touch screen display 2 is detected in the locked state.

The camera 12 is an in-camera for photographing an object facing the front face 1A. The camera 13 is an out-camera for photographing an object facing the back face 1B.

The connector 14 is a terminal to which other device is connected. The connector 14 may be a general-purpose terminal such as a Universal Serial Bus (USB), a High-Definition Multimedia Interface (HDMI), Light Peak (Thunderbolt), and an earphone/microphone connector. The connector 14 may be a dedicated terminal such as a dock connector. Examples of the devices connected to the connector 14 include, but are not limited to, an external storage device, a speaker, and a communication device.

The acceleration sensor 15 detects a direction and a magnitude of acceleration applied to the smartphone 1. The direction sensor 16 detects a direction of geomagnetism. The gyroscope 17 detects an angle and an angular velocity of the smartphone 1. The detection results of the acceleration sensor 15, the direction sensor 16, and the gyroscope 17 are used in combination with each other in order to detect a position of the smartphone 1 and a change of its attitude.

Part or all of the programs and the data stored in the storage 9 in FIG. 5 may be downloaded from any other device through communication by the communication unit 6. Part or all of the programs and the data stored in the storage 9 in FIG. 5 may be stored in the non-transitory storage medium that can be read by the reader included in the storage 9. Part or all of the programs and the data stored in the storage 9 in FIG. 5 may be stored in the non-transitory storage medium that can be read by a reader connected to the connector 14. Examples of the non-transitory storage mediums include, but are not limited to, an optical disc such as CD, DVD, and Blu-ray, a magneto-optical disc, magnetic storage medium, a memory card, and solid-state storage medium.

The configuration of the smartphone 1 illustrated in FIG. 5 is only an example, and therefore it can be modified as required within a scope that does not depart from the gist of the present invention. For example, the number and the type of the button 3 are not limited to the example of FIG. 5. The smartphone 1 may be provided with buttons of a numeric keypad layout or a QWERTY layout and so on as buttons for operation of the screen instead of the buttons 3A to 3C. The smartphone 1 may be provided with only one button to operate the screen, or with no button. In the example of FIG. 5, the smartphone 1 is provided with two cameras; however, the smartphone 1 may be provided with only one camera or with no camera. In the example of FIG. 5, the smartphone 1 is provided with three types of sensors in order to detect its position and attitude; however, the smartphone 1 does not have to be provided with some of the sensors. Alternatively, the smartphone 1 may be provided with any other type of sensor for detecting at least one of the position and the attitude.

Examples of the controls based on the functions provided by the control program 9A will be explained below with reference to FIG. 6 to FIG. 10. The functions provided by the control program 9A include a function for releasing, when a distance between a first touch and a second touch on the touch screen display 2 is changed in a locked state, the locked state. Below is an example of the control executed according to a user's instruction while the locked state is set.

Figure 6:
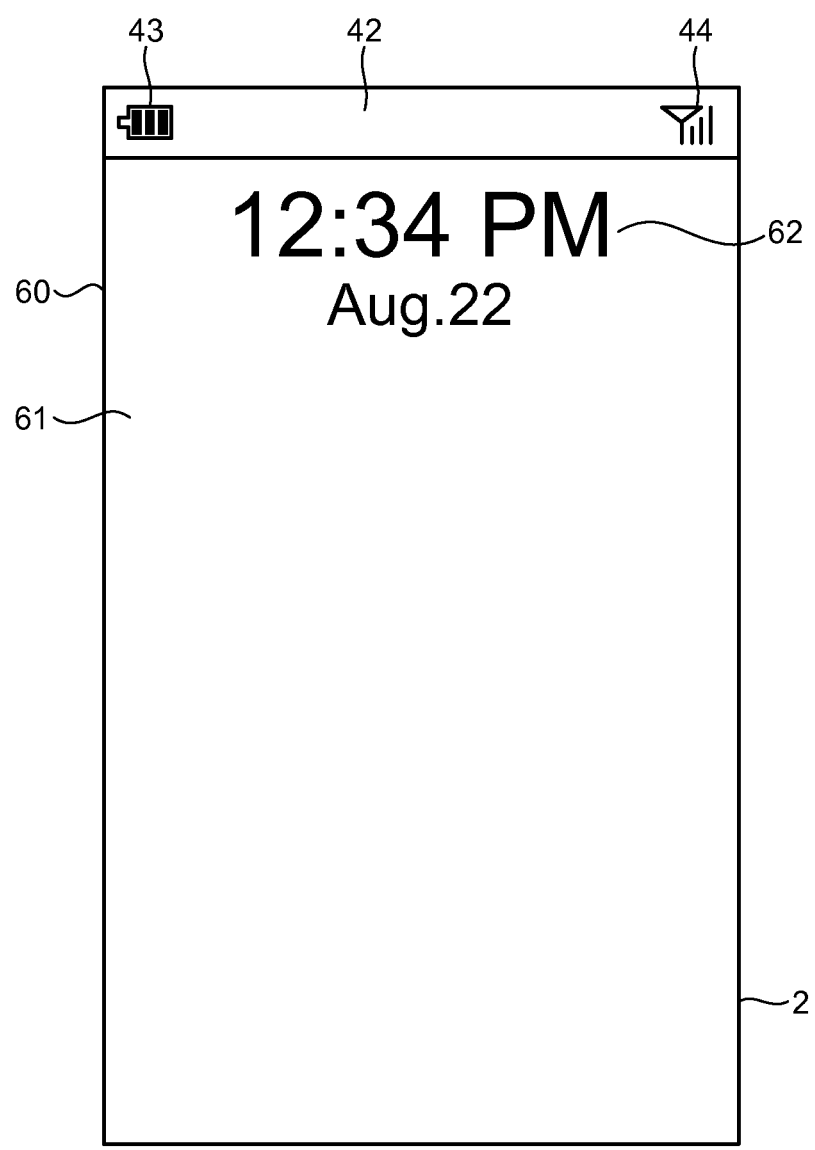
FIG. 6 is a diagram illustrating an example of a lock screen.

An example of the lock screen will be explained below with reference to FIG. 6. The lock screen is displayed on the display 2A while the locked state is set, that is, while the setting of the locked state is ON. FIG. 6 depicts the example of the lock screen. A lock screen 60 indicates that the locked state is set. When a preset unlock gesture is detected, the lock screen 60 changes to another screen. In other words, the lock screen 60 is a screen in which any gesture other than a preset gesture is determined as invalid. The smartphone 1 is not allowed to perform various operations until a specific gesture is detected on the lock screen.

Provided in the lock screen 60 illustrated in FIG. 6 is a date and time image 62 on a wallpaper 61. The lock screen 60 has an area 42, which is the same as the area 42 in the home screen 40, provided along the top edge of the display 2A. The lock screen 60 displays a remaining mark 43 indicating a remaining amount of a power supply and a radio-wave level mark 44 indicating an electric field strength of radio wave for communication in the area 42. The wallpaper 61 is displayed behind the date and time image 62.

The date and time image 62 indicates time and date, which appears in an area located in an upper portion of the lock screen 60 and below the area 42. The date and time image 62 illustrated in FIG. 6 has a status display indicating a time which is "12:34 PM" representing 12 o'clock and 34 minutes in the afternoon and a status display indicating a date which is "August 22" representing 22nd, August.

When detecting a specific gesture performed on the lock screen 60, the smartphone 1 releases the locked state and displays a screen having been displayed before the locked state is set on the display 2A. For example, when a screen having been displayed before the locked state is set is the home screen 40, the smartphone 1 displays the home screen 40 on the display 2A. The specific gesture will be explained later.

Figure 7:
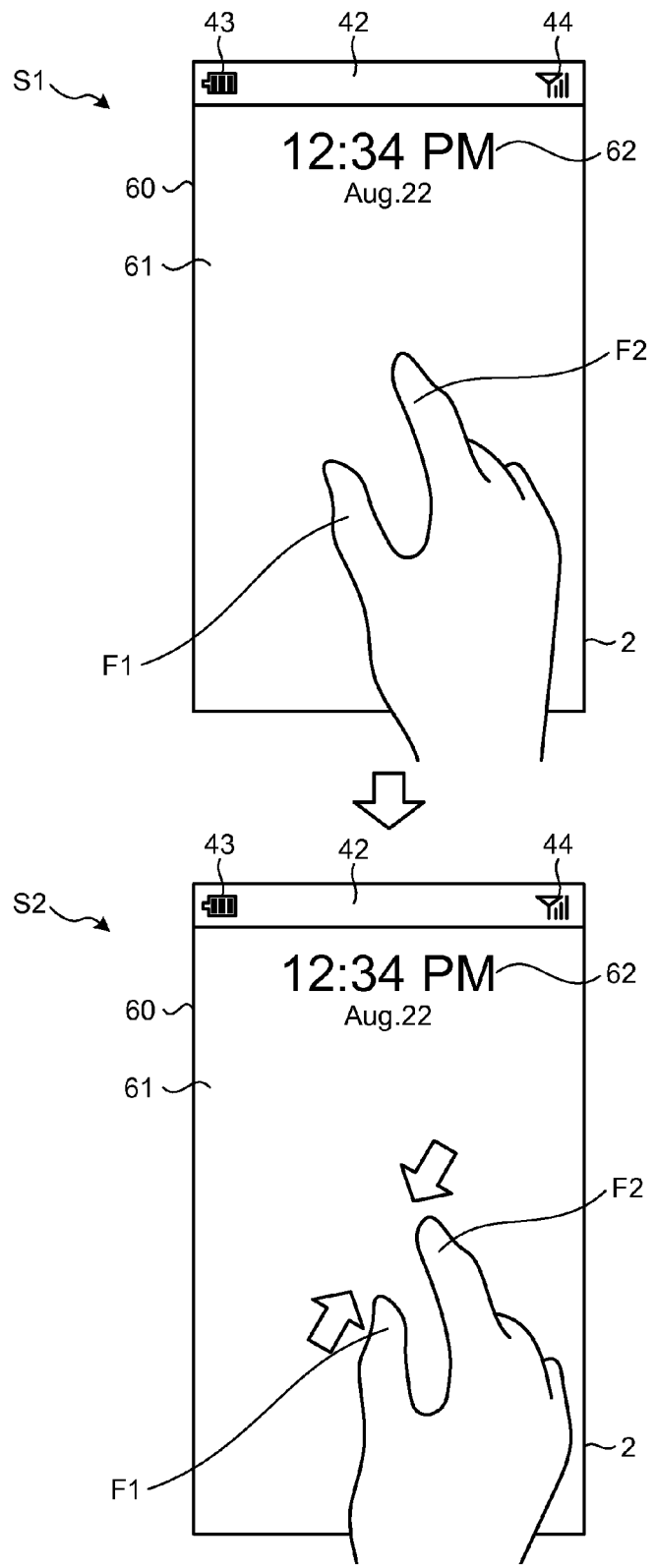
FIG. 7 is a diagram illustrating an example of control during display of the lock screen.

An example of the specific gesture performed on the lock screen 60 will be explained with reference to FIG. 7. At Step S1 illustrated in FIG. 7, the lock screen 60 is displayed on the display 2A. At Step S1, user's two fingers touch the lock screen 60. Specifically, user's finger F1 and finger F2 touch a substantially central portion on the wallpaper 61 of the lock screen 60. In this case, the smartphone 1 detects each touch at each of portions where the finger F1 and the finger F2 touch the lock screen 60 respectively. In the present embodiment, the smartphone 1 detects the touch at the portion of the lock screen 60 touched by the finger F1 as a first touch. The smartphone 1 detects the touch at the portion of the lock screen 60 touched by the finger F2 as a second touch. When detecting the first touch and the second touch, the smartphone 1 calculates a distance between the position where the first touch is detected and the position where the second touch is detected.

At Step S2, the finger F1 and the finger F2 move in a direction closer to each other while the finger F1 and finger F2 are in contact to the lock screen 60. That is, the user performs pinch in, in a direction in which the finger F1 and the finger F2 move closer to each other. In this case, the smartphone 1 detects a pinch-in gesture to move the finger F1 and the finger F2 closer to each other through the touch screen display 2. In other words, in the example of FIG. 7, the smartphone 1 detects a change in the distance between the first touch and the second touch. Specifically, the smartphone 1 detects that at least one of the first touch and the second touch moves closer to the other. The smartphone 1 may detect that the distance between the first touch and the second touch becomes shorter than a threshold in addition to the moving of at least one of the first touch and the second touch closer to the other. Alternatively, the smartphone 1 may detect that the distance between the first touch and the second touch becomes shorter than the threshold instead of the moving of at least one of the first touch and the second touch closer to the other. Specifically, the smartphone 1 calculates a distance between the finger F1 and the finger F2 after at least one of the finger F1 and the finger F2 moves in a direction closer to the other along a line segment connecting an initial position where the first touch is detected and an initial position where the second touch is detected. The smartphone 1 then compares the calculated distance with the threshold to thereby detect that the distance between the first touch and the second touch becomes shorter than the threshold.

In the present embodiment, the threshold may be a fixed value previously specified or may be a variable value determined according to an initial distance at the time when the first touch and the second touch are detected. For example, the smartphone 1 calculates an initial distance between the initial position where the first touch is detected and the initial position where the second touch is detected, and sets a distance corresponding to a predetermined ratio of the initial distance as the threshold. In the example of FIG. 7, the smartphone 1 calculates an initial position between the finger F1 and the finger F2 at the time of detecting the touches performed by the finger F1 and the finger F2 at Step S1, and sets a distance being one-half the initial distance as the threshold.

When detecting a pinch-in gesture to move the finger F1 and the finger F2 closer to each other through the touch screen display 2 in the locked state in which the lock screen 60 is displayed, the smartphone 1 releases the locked state and displays a screen having been displayed before the locked state is set on the touch screen display 2.

Figure 8:
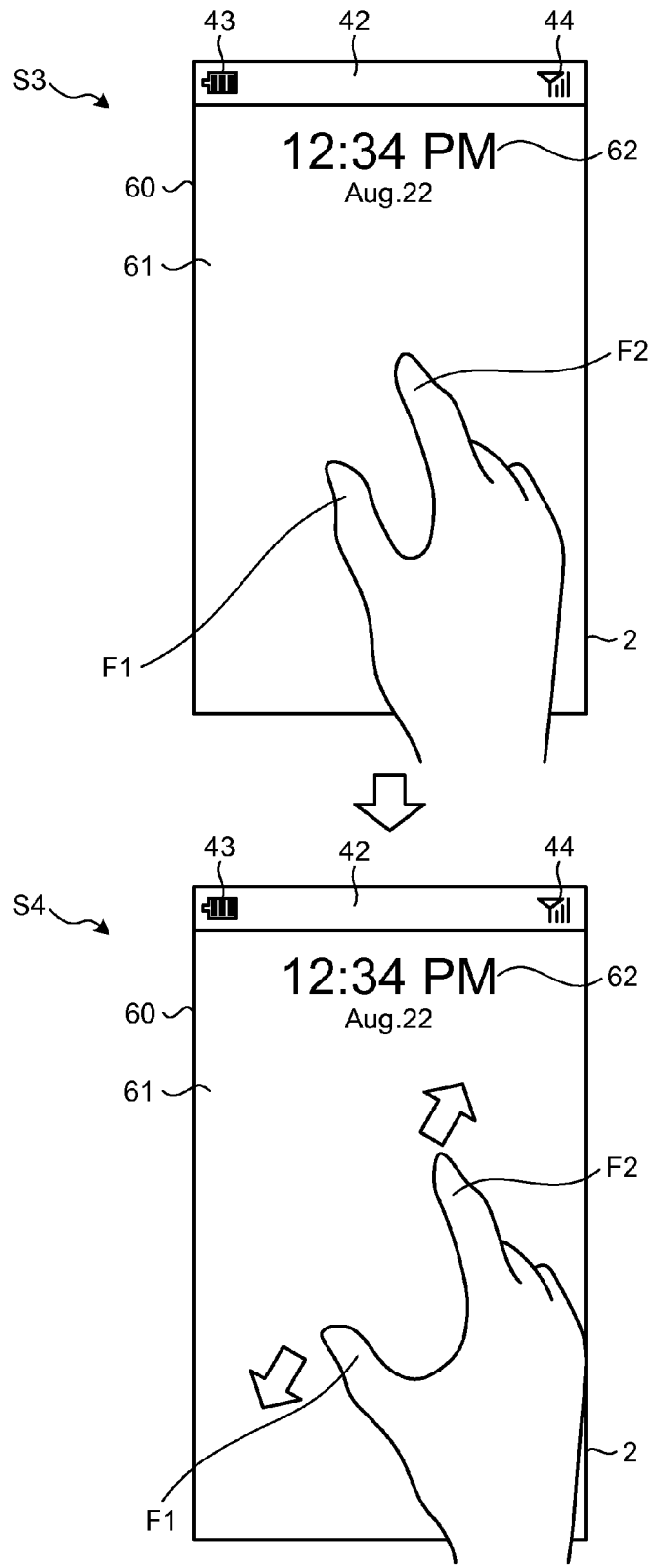
FIG. 8 is a diagram illustrating another example of the control during the display of the lock screen.

Another example of the specific gesture performed on the lock screen 60 will be explained with reference to FIG. 8. At Step S3 in FIG. 8, the lock screen 60 is displayed on the display 2A. At Step S3, the finger F1 and finger F2 touch the lock screen 60. In this case, the smartphone 1 detects touches at portions where the finger F1 and the finger F2 are in contact to the lock screen 60 as a first touch and a second touch respectively. When detecting the first touch and the second touch, the smartphone 1 calculates a distance between the position where the first touch is detected and the position where the second touch is detected.

At Step S4, the finger F1 and the finger F2 move in a direction further away from each other while the finger F1 and finger F2 are in contact to the lock screen 60. That is, the user performs pinch out in a direction in which the finger F1 and the finger F2 move further away from each other. In this case, the smartphone 1 detects a pinch-out gesture to move the finger F1 and the finger F2 further away from each other through the touch screen display 2. In other words, in the example of FIG. 8, the smartphone 1 detects a change in the distance between the first touch and the second touch. Specifically, the smartphone 1 detects that at least one of the first touch and the second touch moves further away from the other. The smartphone 1 may detect that the distance between the first touch and the second touch becomes longer than the threshold in addition to the moving of at least one of the first touch and the second touch further away from the other. Alternatively, the smartphone 1 may detect that the distance between the first touch and the second touch becomes longer than the threshold instead of the moving of at least one of the first touch and the second touch further away from the other. Specifically, the smartphone 1 calculates a distance between the finger F1 and the finger F2 after at least one of the finger F1 and the finger F2 moves in a direction further away from the other along a line segment connecting an initial position where the first touch is detected and an initial position where the second touch is detected. The smartphone 1 then compares the calculated distance with the threshold to thereby detect that the distance between the first touch and the second touch becomes longer than the threshold.

In the present embodiment, the threshold may be a fixed value previously specified or may be a variable value determined according to an initial distance at the time when the first touch and the second touch are detected. For example, the smartphone 1 calculates an initial distance between the initial position where the first touch is detected and the initial position where the second touch is detected, and sets a distance corresponding to a predetermined ratio of the initial distance as the threshold. In the example of FIG. 8, the smartphone 1 calculates an initial position between the finger F1 and the finger F2 at the time of detecting the touches performed by the finger F1 and the finger F2 at Step S3, and sets a distance being twice the initial distance as the threshold.

When detecting a pinch-out gesture to move the finger F1 and the finger F2 further away from each other through the touch screen display 2 in the locked state in which the lock screen 60 is displayed, the smartphone 1 releases the locked state and displays a screen having been displayed before the locked state is set on the touch screen display 2.

As explained above, the smartphone 1 according to the present embodiment sets the pinch-in gesture or the pinch-out gesture performed on the lock screen 60 as the specific gesture performed on the lock screen 60.

Figure 9:
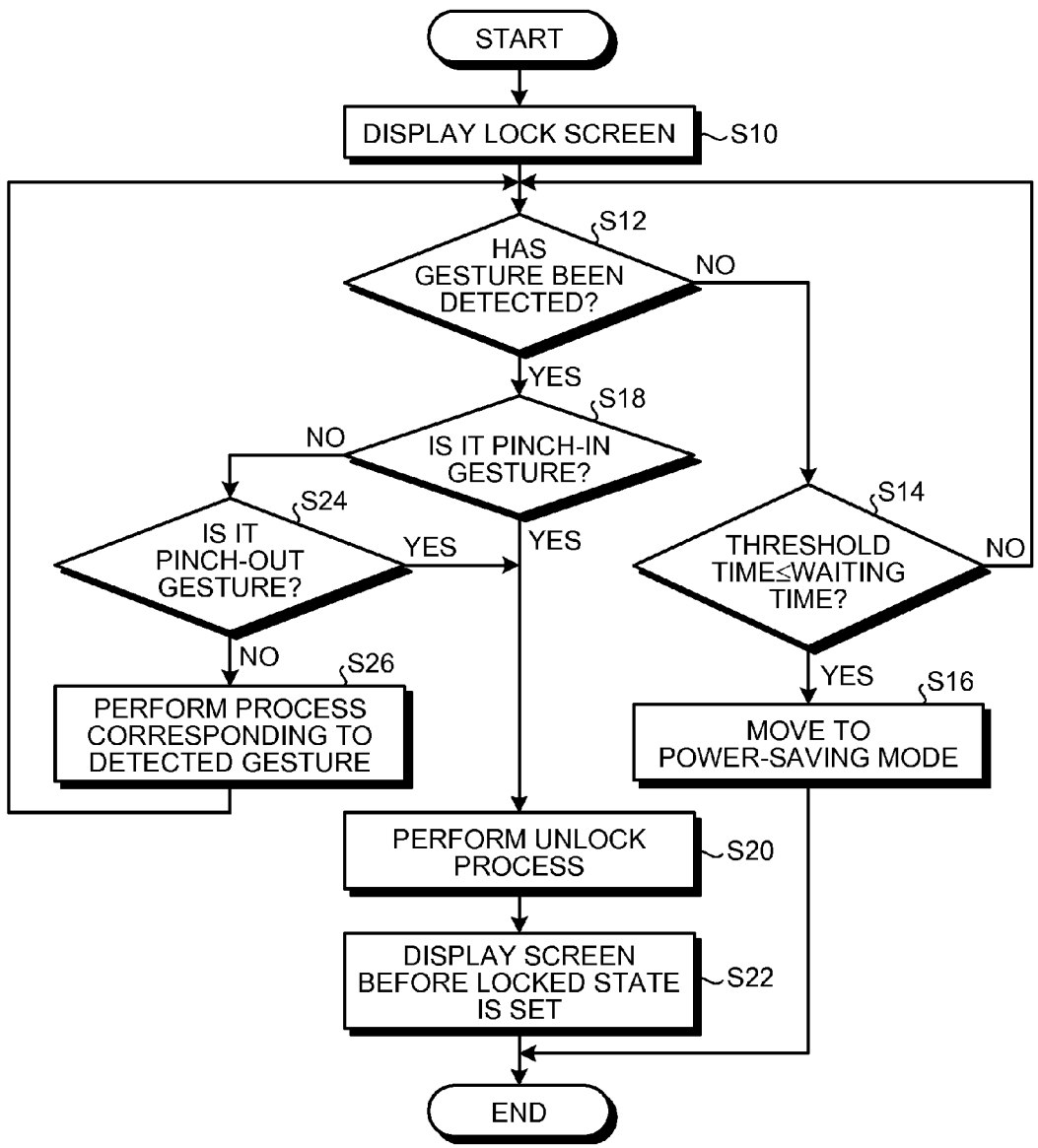
FIG. 9 is a flowchart illustrating a procedure for the control executed in a locked state.

An example of a procedure for the control based on the functions provided by the control program 9A will be explained below with reference to FIG. 9. FIG. 9 depicts a procedure for the control executed in the locked state, particularly, the control executed during display of the lock screen. The procedure in FIG. 9 is implemented by the controller 10 executing the control program 9A. The procedure in FIG. 9 is executed when the locked state is set and an operation for displaying a screen on the display 2A is detected. The case in which an operation for displaying a screen on the display 2A is detected represents a case in which, for example, a screen resuming operation is detected while a power-saving mode is set and no screen is displayed on the touch screen display 2. The controller 10 may execute other procedure for control related to the lock screen 60 in parallel with the procedure in FIG. 9.

At Step S10, the controller 10 displays the lock screen on the touch screen display 2. After the display of the lock screen at Step S10, at Step S12, the controller 10 determines whether a gesture has been detected. That is, the controller 10 acquires a detection result of the touch screen 2B and determines whether a gesture has been detected based on the acquired detection result. When it is determined that a gesture has not been detected at Step S12 (No at Step S12), then at Step S14, the controller 10 determines whether a waiting time is equal to or longer than a threshold time. The controller 10 determines whether the waiting time being an elapsed time since the latest operation is completed is a predetermined threshold time or more.

When it is determined that the waiting time is not equal to or longer than the threshold time at Step S14 (No at Step S14), that is, that the waiting time is shorter than the threshold time, the controller 10 proceeds to Step S12, and determines again whether a gesture has been detected. When it is determined that the waiting time is equal to or longer than the threshold time at Step S14 (Yes at Step S14), then at Step S16, the controller 10 moves to the power-saving mode and ends the present process. That is, the controller 10 turns off the touch screen display 2 to be in a state of not displaying the lock screen, and ends the present process.

When it is determined that a gesture has been detected at Step S12 (Yes at Step S12), then at Step S18, the controller 10 determines whether the gesture is a pinch-in gesture performed on the lock screen. That is, the controller 10 determines whether the gesture detected at Step S12 is a pinch-in gesture performed on the lock screen.

When it is detected that the gesture is a pinch-in gesture performed on the lock screen at Step S18 (Yes at Step S18), then at Step S20, the controller 10 performs an unlock process, and at Step S22, displays a screen having been displayed before the locked state is set on the touch screen display 2. The controller 10 displays another screen such as the home screen at Step S22, and then ends the present process.

When it is detected that the gesture is not a pinch-in gesture performed on the lock screen at Step S18 (No at Step S18), then at Step S24, the controller 10 determines whether the gesture is a pinch-out gesture performed on the lock screen. That is, the controller 10 determines whether the gesture detected at Step S12 is a pinch-out gesture performed on the lock screen.

When it is detected that the gesture is a pinch-out gesture performed on the lock screen at Step S24 (Yes at Step S24), then at Step S20, the controller 10 performs the unlock process, and at Step S22, displays the screen having been displayed before the locked state is set on the touch screen display 2. The controller 10 displays another screen such as the home screen at Step S22, and then ends the present process.

When it is detected that the gesture is not a pinch-out gesture performed on the lock screen at Step S24 (No at Step S24), then at Step S26, the controller 10 performs a process corresponding to the detected gesture and proceeds to Step S12. The process corresponding to the detected gesture includes a display process of a screen such as a help screen or an emergency calls screen that can be displayed on the lock screen, and the like.

In this way, in the present embodiment, when the lock screen is displayed and a pinch-in gesture or a pinch-out gesture performed on the lock screen is detected in the locked state in which the lock screen is displayed, the smartphone 1 performs the unlock process and displays a screen having been displayed before the locked state is set on the touch screen display 2. This enables a user's simple unlock operation to be quickly returned to the screen having been displayed before the locked state is set from the locked state. Therefore, according to the present embodiment, the operability of the unlock operation can be improved.

Another example of the lock screen will be explained below with reference to FIG. 10. A lock screen 60a illustrated in FIG. 10 is different from the lock screen 60 in FIG. 6, and one padlock icon 64 and three application icons 68a, 68b, and 68c are further arranged on the wallpaper 61 of the lock screen 60a.

The padlock icon 64 (first object) is an image representing a padlock, which is displayed in an area on the lower end side of the lock screen 60a. In the present embodiment, the padlock icon 64 is associated with execution of the unlock process. When detecting a specific gesture performed for the padlock icon 64, the smartphone 1 releases the locked state and displays a screen having been displayed before the locked state is set on the display 2A. The specific gesture will be explained later.

The application icons (second objects) 68a, 68b, and 68c are displayed while being arrayed in a substantially central portion of the lock screen 60a. Each of the application icons 68a, 68b, and 68c is associated with execution of the unlock process and with a specific application installed into the smartphone 1. When detecting a specific gesture performed for any of the application icons 68a, 68b, and 68c, the smartphone 1 releases the locked state and executes an application associated with the corresponding one of the application icons 68a, 68b, and 68c. The specific gesture will be explained later.

Figure 10:
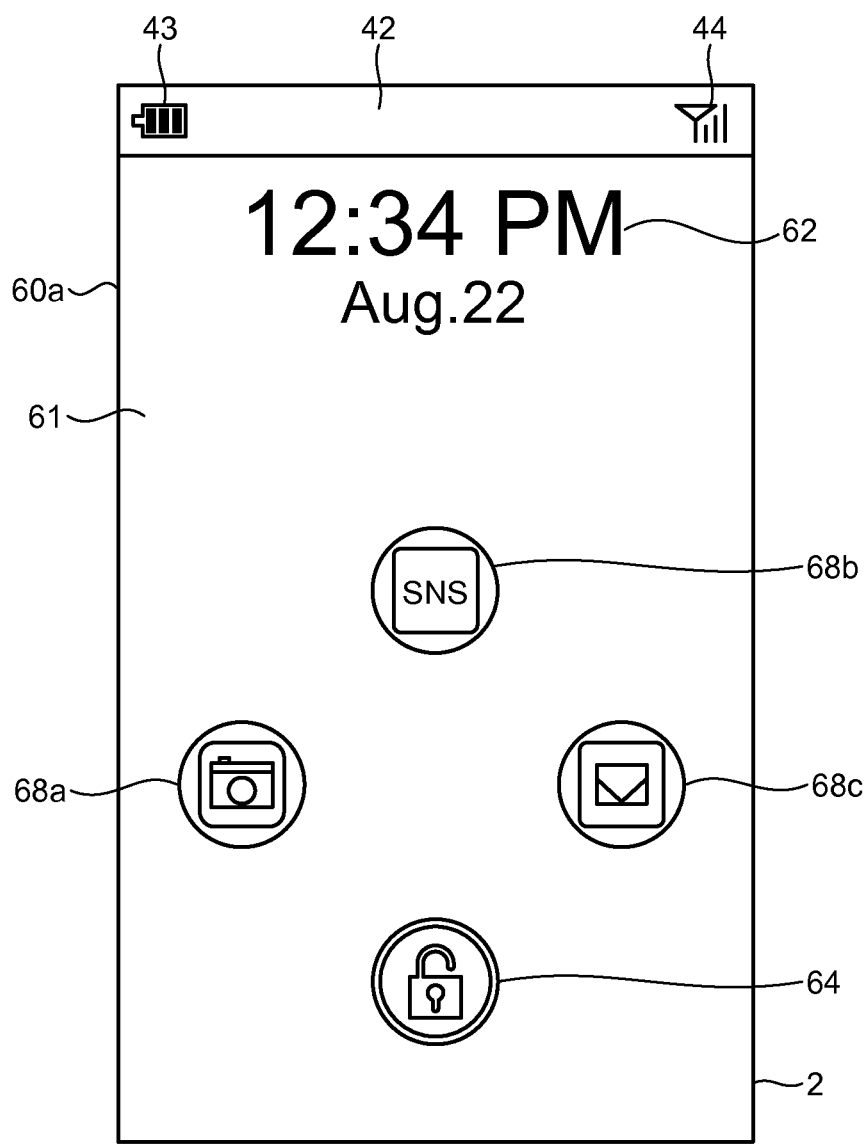
FIG. 10 is a diagram illustrating another example of the lock screen.

The application icon 68a in the example of FIG. 10 is associated with a camera application. The application icon 68b therein is associated with a SNS application. The application icon 68c therein is associated with a mail application.

The application icons 68a, 68b, and 68c include images representing corresponding applications respectively. Each of the application icons 68a, 68b, and 68c may include an image with text similar to the icon 50, or may include a symbol or a graphic instead of an image. The application icons 68a, 68b, and 68c may include only a character string without an image.

The specific gesture performed for the padlock icon 64 will be explained with reference to FIG. 11. At Step S5 in FIG. 11, the lock screen 60a is displayed on the display 2A. At Step S5, the finger F1 and finger F2 touch around the padlock icon 64 arranged on the lock screen 60a. Specifically, the finger F1 touches a substantially lower left position of the padlock icon 64, and the finger F2 touches a substantially upper right position thereof. In this case, the smartphone 1 detects the touches at the portions to which the finger F1 and finger F2 are in contact around the padlock icon 64 arranged on the lock screen 60a as the first touch and the second touch respectively. The smartphone 1 selects the padlock icon 64, as a processing object, being on a line segment connecting the position where the first touch is detected and the position where the second touch is detected. When detecting the first touch and the second touch, the smartphone 1 calculates a distance between the position where the first touch is detected and the position where the second touch is detected.

At Step S6, the finger F1 and finger F2 move in a direction closer to each other while the finger F1 and finger F2 are in contact to around the padlock icon 64 on the lock screen 60. That is, the user performs pinch in, in the direction in which the finger F1 and the finger F2 move closer to each other with the padlock icon 64 interposed therebetween. In this case, the smartphone 1 detects a pinch-in gesture performed for the padlock icon 64 through the touch screen display 2. In other words, in the example of FIG. 11, the smartphone 1 detects a change in a distance between the first touch and the second touch detected around the padlock icon 64 such that the padlock icon 64 is interposed therebetween. Specifically, the smartphone 1 detects a gesture to move at least one of the first touch and the second touch closer to the position where the padlock icon 64 is arranged. The smartphone 1 may also detect that at least one of the distance between the first touch and the position of the padlock icon 64 and the distance between the second touch and the position of the padlock icon 64 becomes shorter than the threshold. Specifically, the smartphone 1 calculates the distance between the finger F1 and the finger F2 after at least one of the finger F1 and the finger F2 moves in the direction closer to the other along a line segment connecting between the initial position where the first touch is detected, the position where the padlock icon 64 is arranged, and the initial position where the second touch is detected. The smartphone 1 then compares the calculated distance with the threshold to detect that the distance between the first touch and the second touch becomes shorter than the threshold.

When detecting the pinch-in gesture performed for the padlock icon 64 arranged on the lock screen 60a through the touch screen display 2 in the locked state in which the lock screen 60a is displayed, the smartphone 1 releases the locked state and displays a screen having been displayed before the locked state is set on the touch screen display 2.

As explained above, the smartphone 1 according to the present embodiment sets the pinch-in gesture performed for the padlock icon 64 as a specific gesture performed for the padlock icon 64. In the present embodiment, the pinch-in gesture has been explained as an example of the specific gesture performed for the padlock icon 64. However, the specific gesture performed for the padlock icon 64 may be the pinch-out gesture as illustrated in FIG. 8.

Figure 12:
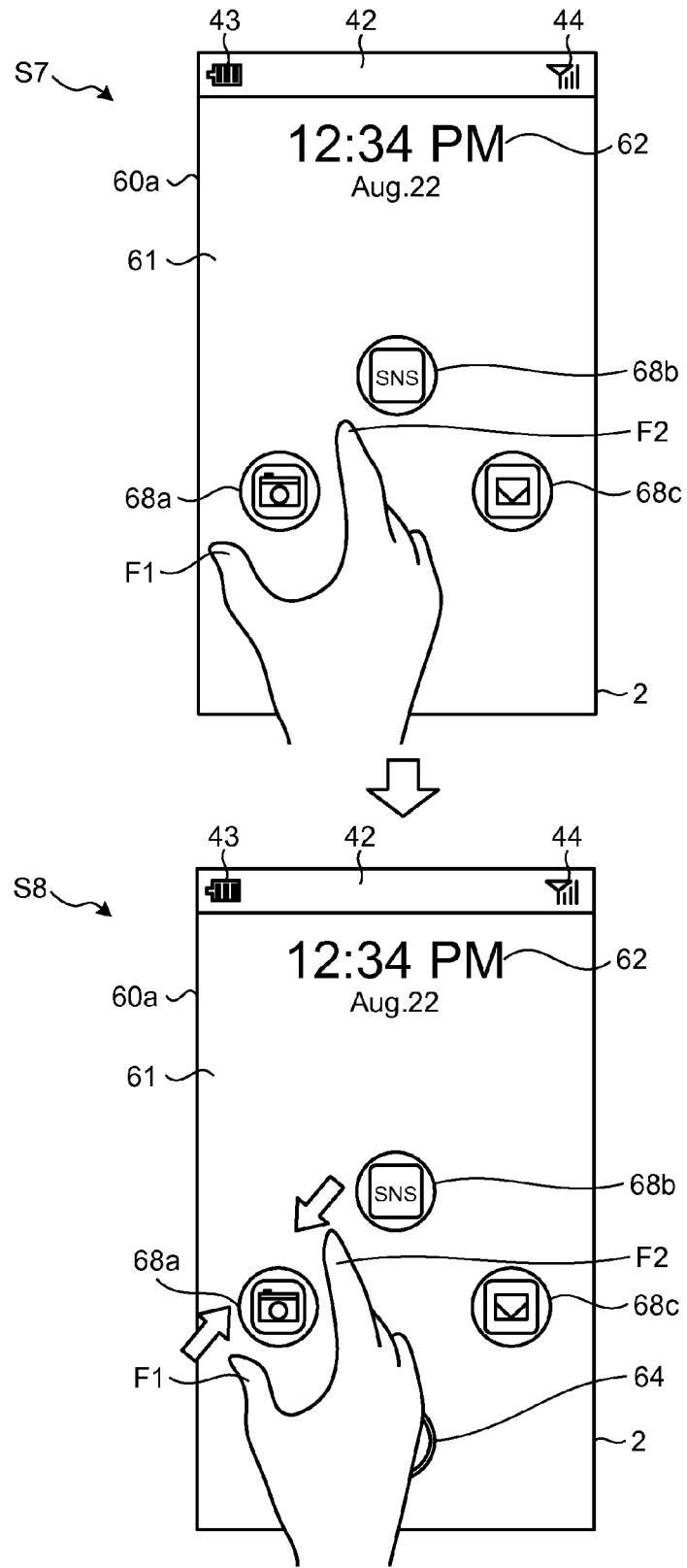
FIG. 12 is a diagram illustrating an example of the control during the display of the lock screen.

Specific gestures performed for the application icons 68a, 68b, and 68c will be explained with reference to FIG. 12. FIG. 12 explains the case in which the user performs a specific gesture for the application icon 68a. At Step S7 in FIG. 12, the lock screen 60a is displayed on the display 2A. At Step S7, the finger F1 and finger F2 touch around the application icon 68a arranged on the lock screen 60a. Specifically, the finger F1 touches a substantially lower left position of the application icon 68a, and the finger F2 touches a substantially upper right position thereof. In this case, the smartphone 1 detects the touches at the portions to which the finger F1 and finger F2 are in contact around the application icon 68a arranged on the lock screen 60a as a first touch and a second touch respectively. The smartphone 1 selects the application icon 68a, as a processing object, being on a line segment connecting the position where the first touch is detected and the position where the second touch is detected. When detecting the first touch and the second touch, the smartphone 1 calculates the distance between the position where the first touch is detected and the position where the second touch is detected.

At Step S8, the finger F1 and finger F2 move in a direction closer to each other while the finger F1 and finger F2 are in contact to around the application icon 68a on the lock screen 60a. That is, the user performs pinch in, in the direction in which the finger F1 and the finger F2 move closer to each other with the application icon 68a interposed therebetween. In this case, the smartphone 1 detects a pinch-in gesture performed for the application icon 68a through the touch screen display 2. In other words, in the example of FIG. 12, the smartphone 1 detects a change in the distance between the first touch and the second touch detected around the application icon 68a such that the application icon 68a is interposed therebetween. Specifically, the smartphone 1 detects a gesture to move at least one of the first touch and the second touch closer to the position where the application icon 68a is arranged. The smartphone 1 may also detect that at least one of the distance between the first touch and the position of the application icon 68a and the distance between the second touch and the position of the application icon 68a becomes shorter than the threshold. Specifically, the smartphone 1 calculates a distance between the finger F1 and the finger F2 after at least one of the finger F1 and the finger F2 moves in a direction closer to the other along the line segment connecting between the initial position where the first touch is detected, the position where the application icon 68a is arranged, and the initial position where the second touch is detected. The smartphone 1 then compares the calculated distance with the threshold to detect that the distance between the first touch and the second touch becomes shorter than the threshold.

When detecting the pinch-in gesture performed for the application icon 68a arranged on the lock screen 60a through the touch screen display 2 in the locked state in which the lock screen 60a is displayed, the smartphone 1 releases the locked state and executes the camera application associated with the application icon 68a. Subsequently, the smartphone 1 displays an operation screen appearing when the camera application is executed as an application corresponding to the application icon 68a on the touch screen display 2.

Figure 13:
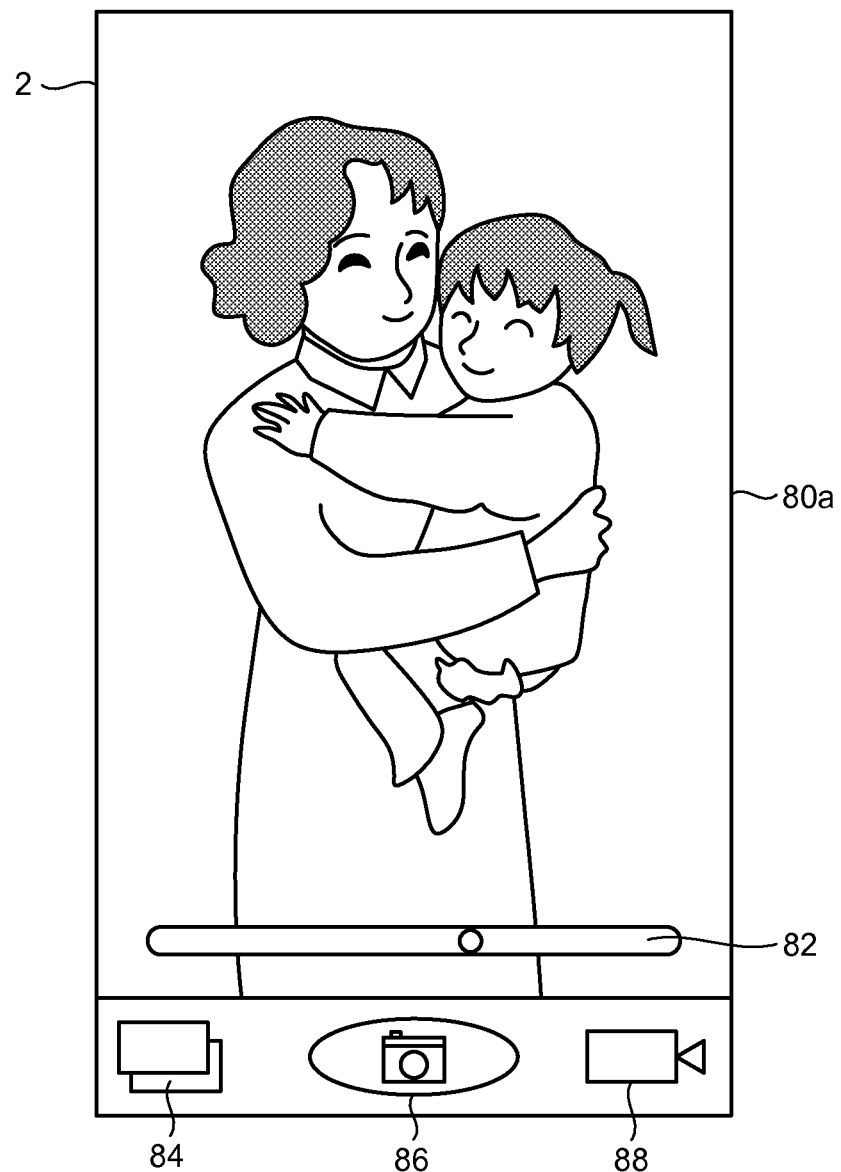
FIG. 13 is a diagram illustrating an example of an operation screen when a camera application is executed.

FIG. 13 depicts an example of the operation screen appearing when the camera application is executed. When the camera application is executed, the smartphone 1 displays an operation screen 80a of FIG. 13 on the touch screen display 2. Arranged on the operation screen 80a in FIG. 13 are a monitor area, provided over the substantially entire area in the upper side of the screen, for checking a subject, and an operation-icon display area below the monitor area. Arranged in the lower side of the monitor area is a control bar 82 to control zoom-in/zoom-out of a camera. Arranged in the operation-icon display area are a photo-album icon 84 at the left for changing to a photo-album function, a shutter icon 86 at the center for capturing a subject displayed in the monitor area, and a video icon 88 at the right for changing to a video function. When a swipe performed on the control bar 82 is detected while displaying the operation screen 80a, the smartphone 1 zooms in or zooms out the subject displayed in the monitor area according to an operation amount and a direction of the swipe. When a tap performed on the photo-album icon 84 is detected while displaying the operation screen 80a, the smartphone 1 changes the operation screen 80a to an operation screen 80c in FIG. 19 explained later. When a tap performed on the shutter icon 86 is detected while displaying the operation screen 80a, the smartphone 1 captures a subject displayed in the monitor area and generates a still image. When a tap performed on the video icon 88 is detected while displaying the operation screen 80a, the smartphone 1 changes the operation screen 80a to an operation screen 80b in FIG. 18 explained later.

As explained above, the smartphone 1 according to the present embodiment sets the pinch-in gesture performed for the application icon 68a as a specific gesture performed for the application icon 68a. In the present embodiment, the pinch-in gesture has been explained as an example of the specific gesture performed for the application icon 68a. However, the specific gesture performed for the application icon 68a may be the pinch-out gesture as illustrated in FIG. 8.

Figure 11:
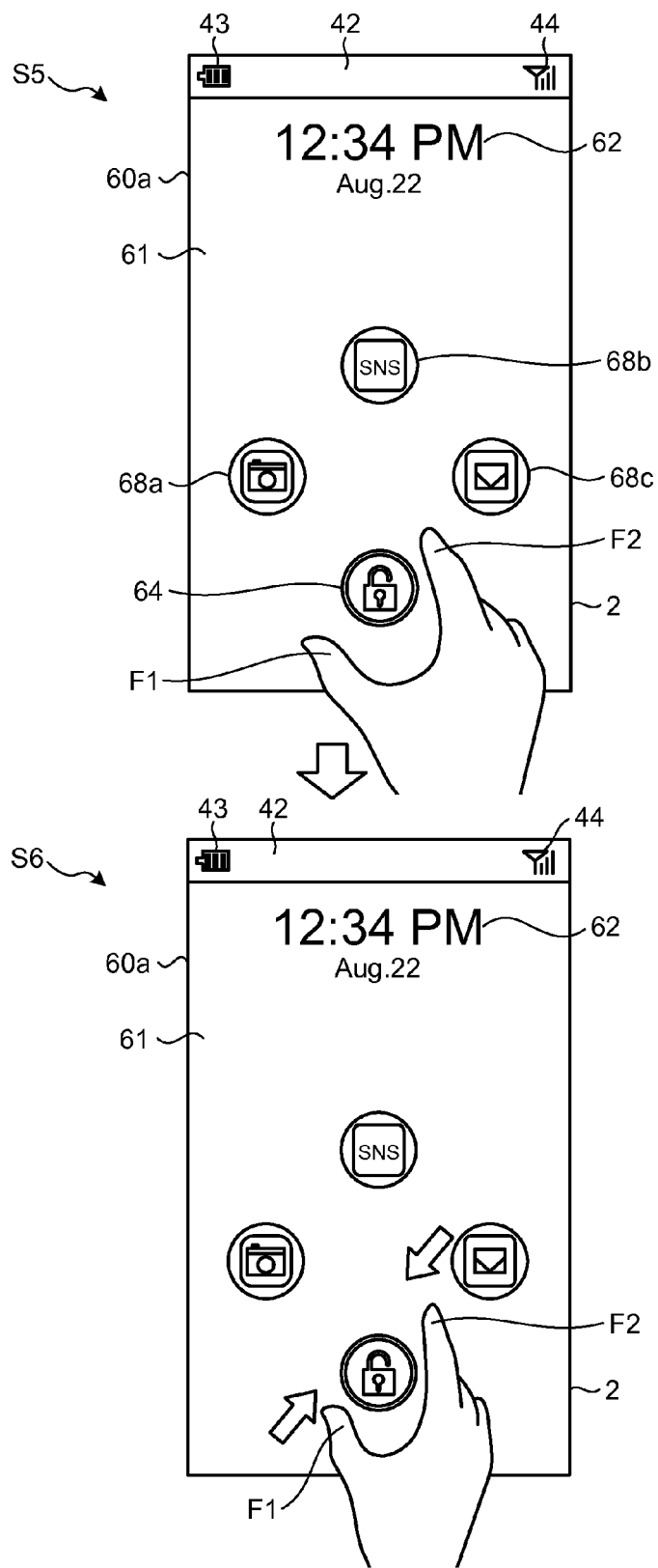
FIG. 11 is a diagram illustrating an example of the control during the display of the lock screen.
Figure 14:
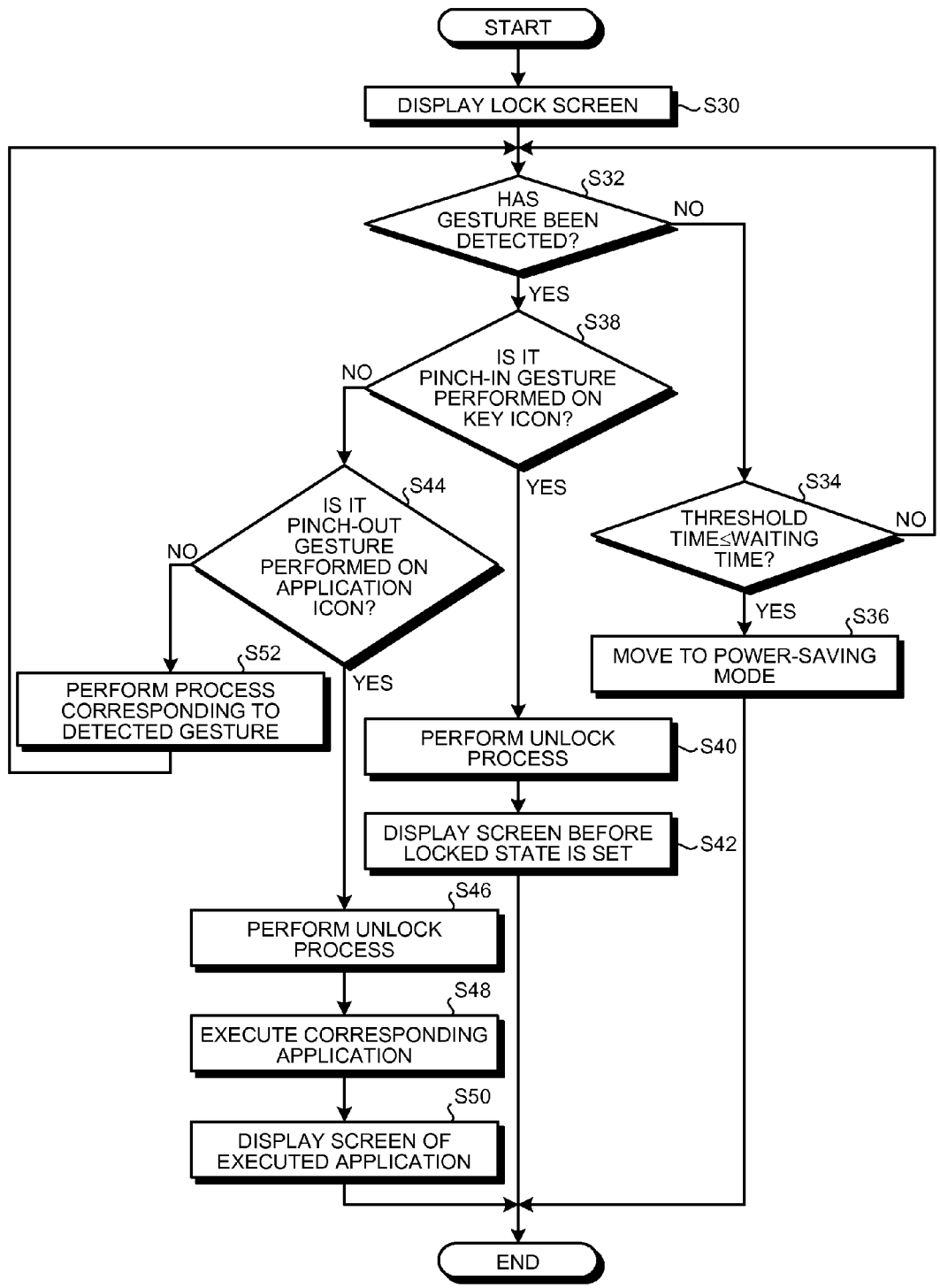
FIG. 14 is a flowchart illustrating a procedure for the control executed in the locked state.

A procedure for the control executed in the locked state in which the lock screen 60a in FIG. 10 to FIG. 12 is displayed will be explained below with reference to FIG. 14. The procedure in FIG. 14 is implemented by the controller 10 executing the control program 9A. The controller 10 may execute other procedure for control related to the lock screen 60a in parallel with the procedure in FIG. 14.

At Step S30, the controller 10 displays a lock screen on the touch screen display 2. After the display of the lock screen at Step S30, at Step S32, the controller 10 determines whether a gesture has been detected. That is, the controller 10 acquires a detection result of the touch screen 2B and determines whether a gesture has been detected based on the acquired detection result. When it is determined that a gesture has not been detected at Step S32 (No at Step S32), then at Step S34, the controller 10 determines whether a waiting time is equal to or longer than a threshold time. The controller 10 determines whether the waiting time being an elapsed time since the latest operation is completed is a predetermined threshold time or more.

When it is determined that the waiting time is not equal to or longer than the threshold time at Step S34 (No at Step S34), that is, that the waiting time is shorter than the threshold time, the controller 10 proceeds to Step S32, and determines again whether a gesture has been detected. When it is determined that the waiting time is equal to or longer than the threshold time at Step S34 (Yes at Step S34), then at Step S36, the controller 10 moves to the power-saving mode and ends the present process. That is, the controller 10 turns off the touch screen display 2 to be in a state of not displaying the lock screen, and ends the present process.

When it is determined that a gesture has been detected at Step S32 (Yes at Step S32), then at Step S38, the controller 10 determines whether the gesture is a pinch-in gesture performed for the padlock icon. That is, the controller 10 determines whether the gesture detected at Step S32 is a pinch-in gesture performed for the padlock icon.

When it is detected that the gesture is a pinch-in gesture performed for the padlock icon at Step S38 (Yes at Step S38), then at Step S40, the controller 10 performs an unlock process, and at Step S42, displays a screen having been displayed before the locked state is set on the touch screen display 2. The controller 10 displays another screen such as the home screen at Step S42, and then ends the present process.

When it is detected that the gesture is not a pinch-in gesture performed for the padlock icon 64 at Step S38 (No at Step S38), then at Step S44, the controller 10 determines whether the gesture is a pinch-in gesture performed for an application icon. That is, the controller 10 determines whether the gesture detected at Step S32 is a pinch-in gesture performed for an application icon.

When it is detected that the gesture is a pinch-in gesture performed for the application icon at Step S44 (Yes at Step S44), then at Step S46, the controller 10 performs the unlock process. At Step S48, the controller 10 executes an application corresponding to the application icon selected as a processing object when the pinch-in gesture is detected, and at Step S50, displays the screen of the executed application on the touch screen display 2. The controller 10 displays the screen of the executed application at Step S50, and then ends the present process.

When it is determined that the gesture is not a pinch-in gesture performed for the application icon at Step S44 (No at Step S24), then at Step S52, the controller 10 performs a process corresponding to the detected gesture and proceeds to Step S32. The process corresponding to the detected gesture includes a display process of a screen such as the help screen or the emergency calls screen that can be displayed on the lock screen, and the like.

In this way, in the present embodiment, the smartphone 1 displays the lock screen on which the padlock icon is arranged. When a pinch-in gesture performed for the padlock icon is detected in the locked state in which the lock screen is displayed, the smartphone 1 performs the unlock process and displays a screen having been displayed before the locked state is set on the touch screen display 2. This enables the user to quickly resume, by a simple unlock operation, the screen having been displayed before the locked state is set from the locked state. The smartphone 1 places the padlock icon on the lock screen, which reduces a possibility that the unlock process is started at user's unintended timing due to a malfunction.

The smartphone 1 displays the lock screen on which an application icon is arranged. When a pinch-in gesture performed for the application icon is detected in the locked state in which the lock screen is displayed, the smartphone 1 performs the unlock process and executes the application corresponding to the application icon. This enables the user to quickly execute a desired application from the locked state. In addition, when detecting a pinch-in gesture performed for an application icon, the smartphone 1 performs the unlock process, an application selection process, and an application execution process. This enables the application icon displayed on the lock screen to function as an icon with a short-cut function. Therefore, the user can input three processes with one gesture. Accordingly, the user can execute a desired application through a shortcut operation in which a partial operation, such as an operation of releasing the locked state and displaying an icon selection screen and an operation of selecting an icon from the icon selection screen, is omitted.

The smartphone 1 determines the detected gesture in order of Step S38 and Step S44 during the processing operation in FIG. 14; however, the order of the determinations is not limited thereto. The smartphone 1 may execute determinations at Step S38 and Step S44 in any order.

The smartphone 1 has been explained using the pinch-in gesture as an example of the specific gesture performed for the padlock icon and for the application icon during the processing operation in FIG. 14. However, the specific gesture performed for the padlock icon and for the application icon may be the pinch-out gesture as illustrated in FIG. 8.

Figure 15:
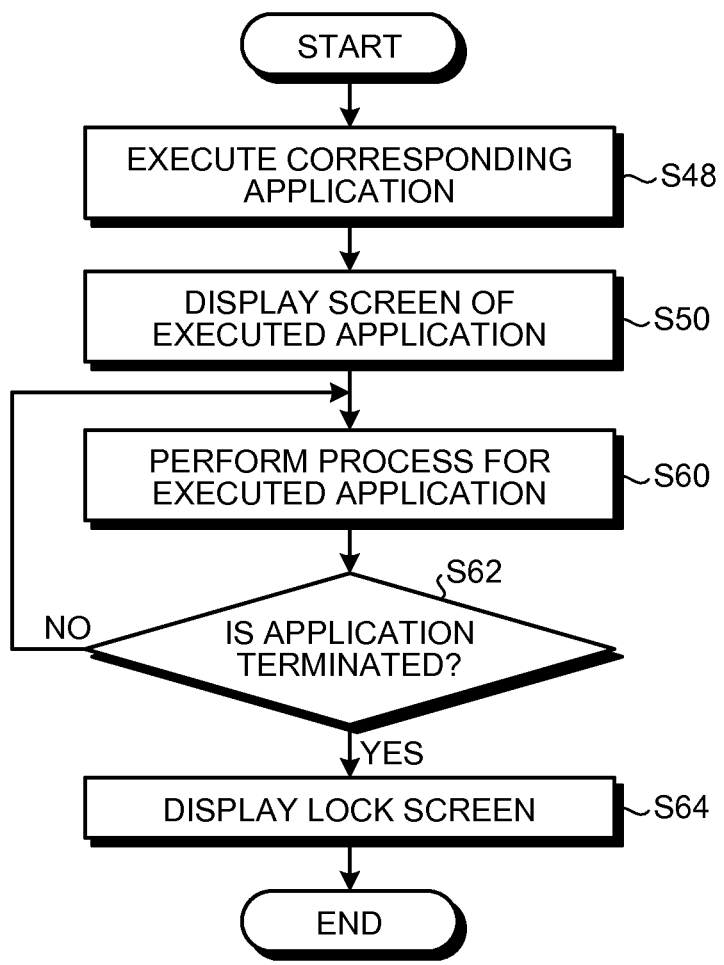
FIG. 15 is a flowchart illustrating another example of the procedure for the control executed in the locked state.

FIG. 15 is a flowchart illustrating another example of the procedure for the control executed in the locked state in which the lock screen 60*a* of FIG. 10 to FIG. 12 is displayed. FIG. 15 depicts another example of the procedure executed when the detected gesture is the pinch-in gesture performed for the application icon, that is, executed when it is determined as Yes at Step S44 of FIG. 14. The procedure in FIG. 15 is implemented by the controller 10 executing the control program 9A.

When it is determined as Yes at Step S44, then at Step S48, the controller 10 executes the application corresponding to an application icon selected as a processing object when the pinch-in gesture is detected, and at Step S50, displays the screen of the executed application on the touch screen display 2. After the display of the screen of the executed application at Step S50, at Step S60, the controller 10 performs the process for the executed application. For example, when detecting a gesture, the controller 10 performs the process corresponding to the detected gesture.

The controller 10 performs the process for the application at Step S60, and at Step S62, determines whether the application is terminated. For example, when a gesture to terminate the application is detected, or when it is determined that a preset processing condition is satisfied, the controller 10 determines that the application is terminated. When it is determined that the application is not terminated (No at Step S62), the controller 10 proceeds to Step S60, and performs the process for the application. When it is determined that the application is terminated (Yes at Step S62), then at Step S64, the controller 10 displays the lock screen and ends the present process. That is, when it is determined as Yes at Step S62, the controller 10 proceeds to Step S30 in FIG. 14, and ends the process illustrated in FIG. 15.

As illustrated in FIG. 15, when the pinch-in gesture preformed for the application icon is detected, the smartphone 1 executes the application corresponding to the application icon selected as a processing object when the pinch-in gesture is detected, and displays again the lock screen after the application is terminated. For example, when the pinch-in gesture performed for the application icon associated with the camera application is detected, the smartphone 1 can execute the processing operation for executing the camera application, controlling the camera to capture a subject, and then returning to the lock screen. This enables the user to use the application corresponding to the application icon displayed on the lock screen while the locked state is not released. That is, the user can execute a set predetermined process without the trouble of inputting an unlock gesture.

Figure 16:
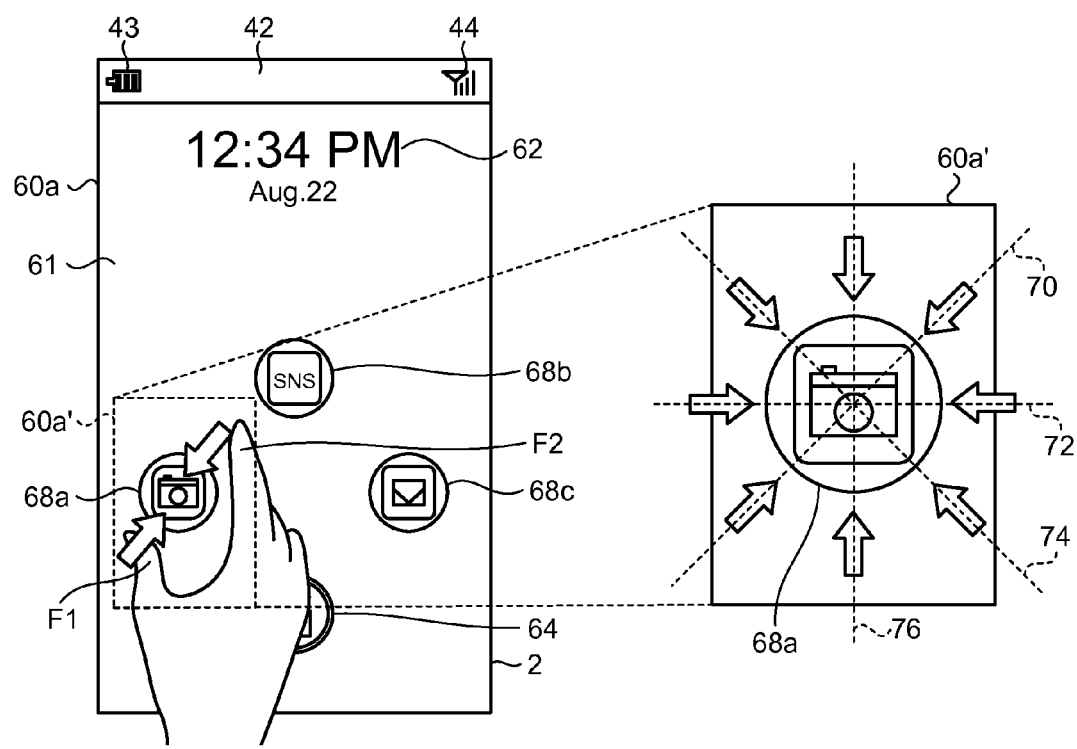
FIG. 16 is a diagram illustrating an example of the control during the display of the lock screen.

The control for changing the function executed by an application according to a direction of a pinch-in gesture performed for an application icon will be explained with reference to FIG. 16 to FIG. 20. FIG. 16 is a diagram for explaining a direction of the pinch-in gesture performed for the application icon 68*a* arranged on the lock screen 60*a*. The lock screen 60*a* at the left side of FIG. 16 represents the similar case to that of the lock screen 60*a* illustrated at Step S8 of FIG. 12. That is, the finger F1 and finger F2 move in a direction closer to each other while the finger F1 and finger F2 are in contact to around the application icon 68*a* on the lock screen 60*a*. In other words, the user performs pinch in, in the direction in which the finger F1 and the finger F2 move closer to each other with the application icon 68*a* interposed therebetween. In this case, the smartphone 1 detects a pinch-in gesture performed for the application icon 68*a* through the touch screen display 2.

A lock screen 60*a*' at the right side of FIG. 16 represents an enlarged diagram of an area around the application icon 68*a* arranged on the lock screen 60*a* at the left side of FIG. 16. The lock screen 60*a*' at the right side of FIG. 16 represents directions of the detected pinch in performed for the application icon 68*a*. As one example, the lock screen 60*a*' at the right side of FIG. 16 represents line segments 70, 72, 74, and 76 each of which connects the first touch and the second touch to be detected by the smartphone 1. The line segment 70 connects a first touch and a second touch to be detected by the smartphone 1 while the finger F1 is in contact to a substantially lower left position of the application icon 68*a* and the finger F2 is in contact to a substantially upper right position of the application icon 68*a*. The line segment 72 connects a first touch and a second touch to be detected by the smartphone 1 while the finger F1 is in contact to a substantially left position of the application icon 68*a* and the finger F2 is in contact to a substantially right position of the application icon 68*a*. The line segment 76 connects a first touch and a second touch detected by the smartphone 1 while the finger F1 is in contact to a substantially lower position of the application icon 68*a* and the finger F2 is in contact to a substantially upper position of the application icon 68*a*. The line segment 74 connects a first touch and a second touch detected by the smartphone 1 while the finger F1 is in contact to a substantially upper left position of the application icon 68a and the finger F2 is in contact to a substantially lower right position of the application icon 68a.

The smartphone 1 changes a function executed by the camera application associated with the application icon 68a according to a direction in which at least one of the first touch and the second touch with respect to the application icon 68a moves closer to the other. Examples of the function executed by the camera application include, but not limited to, a camera function, a video function, and a photo-album function. The details will be given below.

Figure 17:
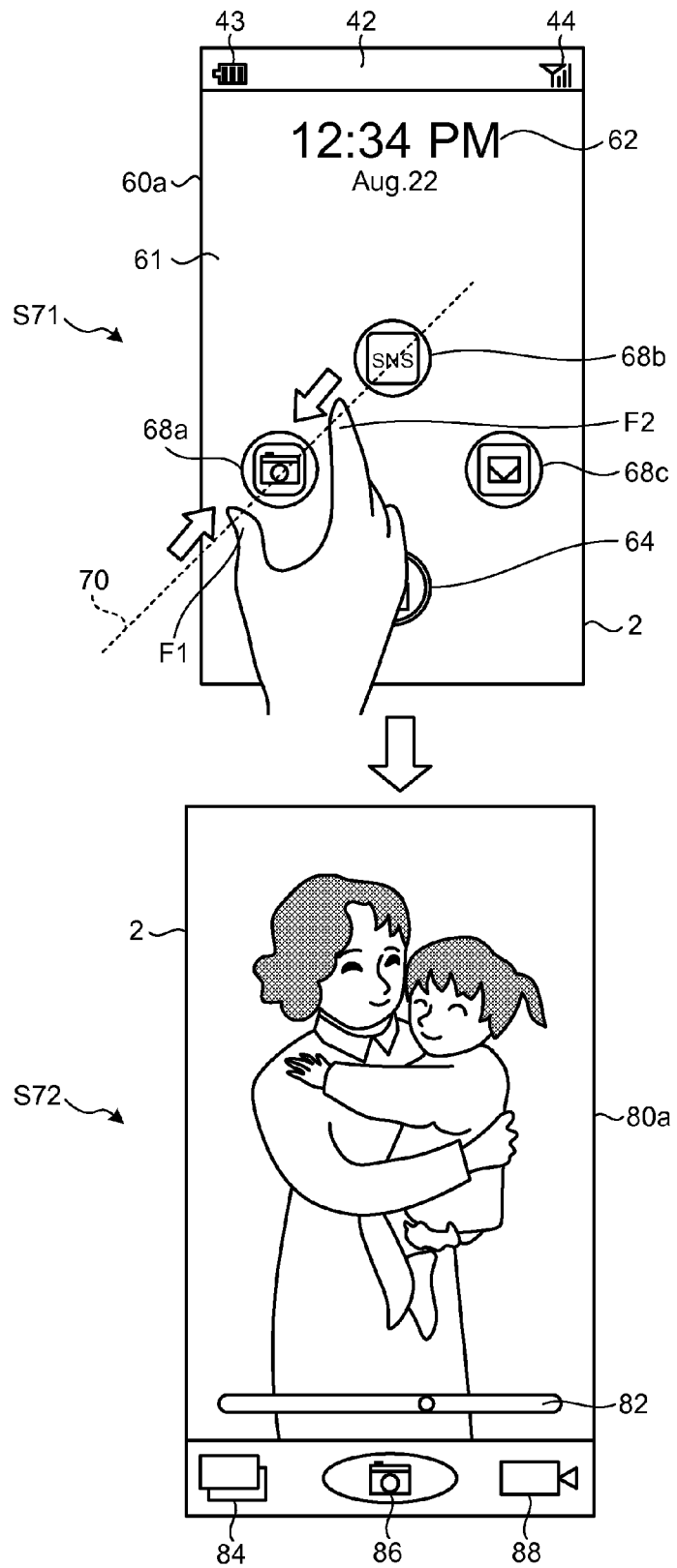
FIG. 17 is a diagram illustrating an example of the control during the display of the lock screen.

For example, as illustrated in FIG. 17, at Step S71, when the user performs a pinch-in gesture from a state in which the finger F1 is in contact to a substantially lower left position of the application icon 68a and the finger F2 is in contact to a substantially upper right position thereof, the smartphone 1 detects the pinch-in gesture in the direction in which the finger F1 and the finger F2 move closer to each other along the line segment 70. In this case, at Step S72, the smartphone 1 displays the operation screen 80a for executing the camera function illustrated in FIG. 13 on the touch screen display 2.

Figure 18:
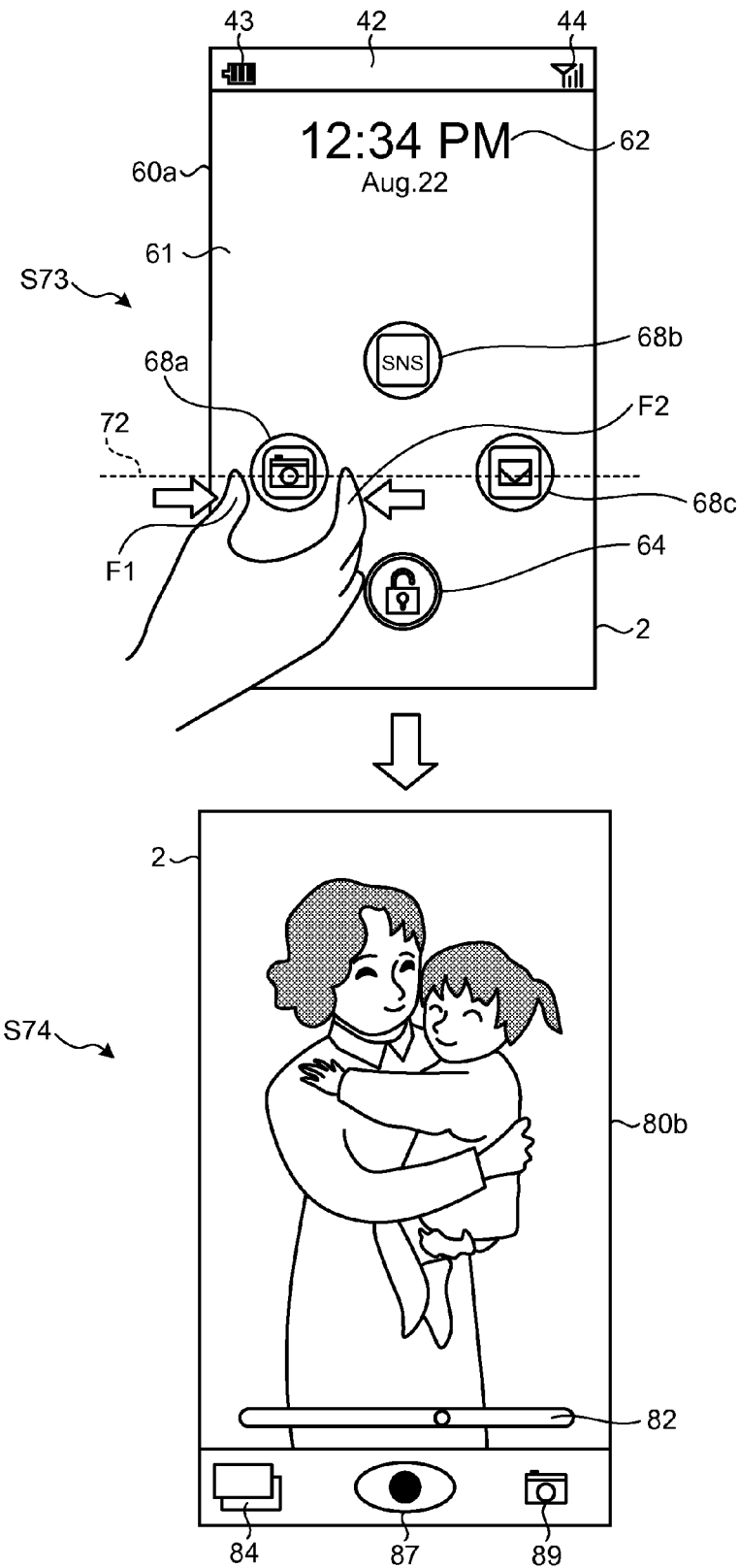
FIG. 18 is a diagram illustrating an example of the control during the display of the lock screen.

For example, as illustrated in FIG. 18, at Step S73, when the user performs a pinch-in gesture from a state in which the finger F1 is in contact to a substantially left position of the application icon 68a and the finger F2 is in contact to a substantially right position thereof, the smartphone 1 detects the pinch-in gesture in the direction in which the finger F1 and the finger F2 move closer to each other along the line segment 72. In this case, at Step S74, the smartphone 1 displays the operation screen 80b for executing the video function on the touch screen display 2.

Arranged on the operation screen 80b in FIG. 18 are a monitor area, provided over the substantially entire area in the upper side of the screen, for checking a subject, and an operation-icon display area below the monitor area. Arranged in the lower side of the monitor area is the control bar 82 to control zoom-in/zoom-out of a camera. Arranged in the operation-icon display area are the photo-album icon 84 at the left for changing to the photo-album function, a start/stop icon 87 at the center for starting or stopping the process of capturing the subject displayed in the monitor area, and a camera icon 89 at the right for changing to the camera function. The start/stop icon 87 functions as a stop icon for stopping a capturing process when it is touched during the capturing of the subject, and functions as a start icon for starting the capturing process when it is touched during the stop of the capturing process. When a swipe performed on the control bar 82 is detected while displaying the operation screen 80b, the smartphone 1 zooms in or zooms out the subject displayed in the monitor area according to an operation amount and a direction of the swipe. When a tap performed on the photo-album icon 84 is detected while displaying the operation screen 80b, the smartphone 1 changes the operation screen 80b to the operation screen 80c of FIG. 19 explained later. When a tap performed on the start/stop icon 87 is detected while displaying the operation screen 80b, the smartphone 1 starts the process for capturing the subject displayed in the monitor area. When a tap performed on the start/stop icon 87 is detected again, the smartphone 1 stops the process for capturing the subject displayed in the monitor area, and generates a moving image. When a tap performed on the camera icon 89 is detected while displaying the operation screen 80b, the smartphone 1 changes the operation screen 80b to the operation screen 80a of FIG. 13.

Figure 19:
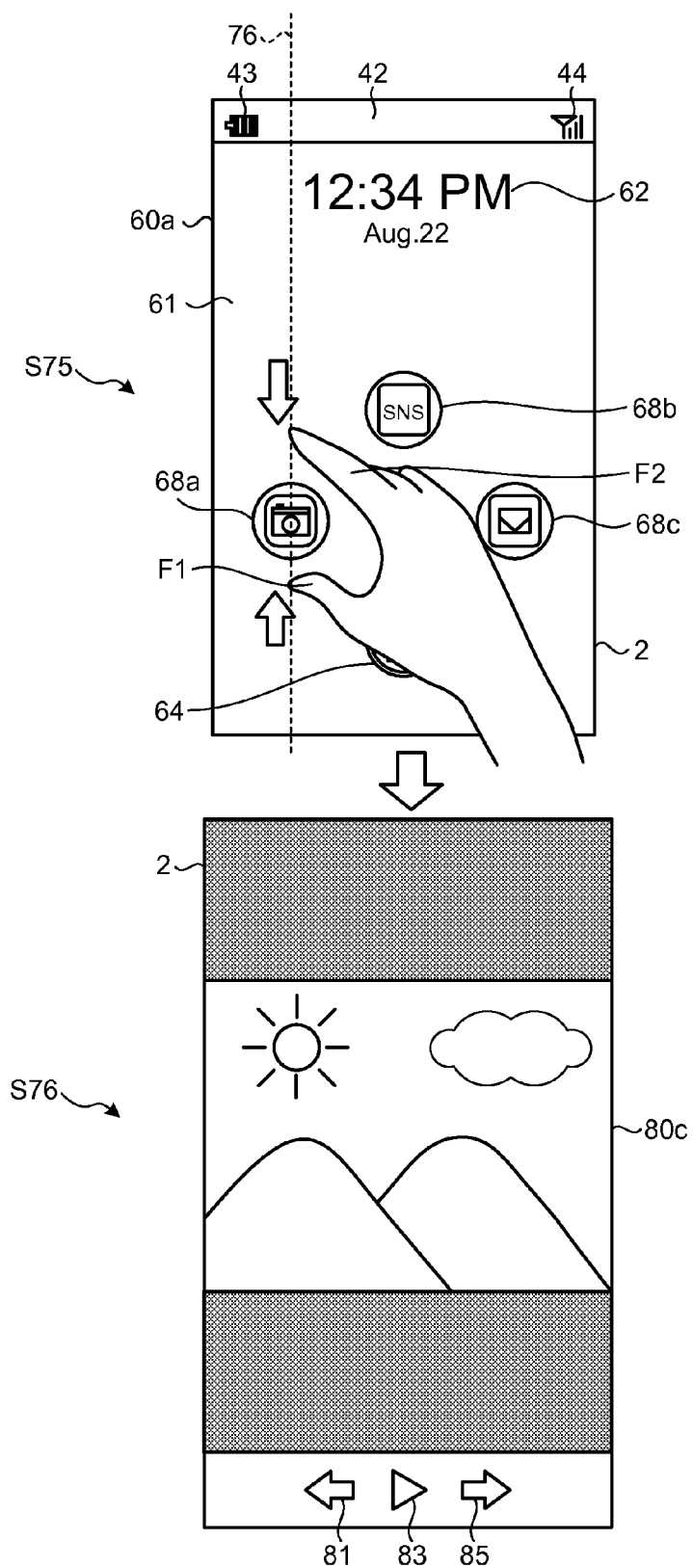
FIG. 19 is a diagram illustrating an example of the control during the display of the lock screen.

For example, as illustrated in FIG. 19, at Step S75, when the user performs a pinch-in gesture from a state in which the finger F1 is in contact to a substantially lower position of the application icon 68a and the finger F2 is in contact to a substantially upper position thereof, the smartphone 1 detects the pinch-in gesture in the direction in which the finger F1 and the finger F2 move closer to each other along the line segment 76. In this case, at Step S76, the smartphone 1 displays the operation screen 80c for executing the photo-album function on the touch screen display 2.

Arranged on the operation screen 80c in FIG. 19 are a monitor area, provided over the substantially entire area in the upper side of the screen, for checking a still image or a moving image captured in the past, and an operation-icon display area below the monitor area. Arranged in the operation-icon display area are a left arrow icon 81 at the left for changing to a screen arranged in the left side on an image list including still images and moving images captured in the past, a slide show icon 83 at the center for starting a slide show of the image list, and a right arrow icon 85 at the right for changing to a screen arranged in the right side on the image list. When a tap performed on the left arrow icon 81 is detected while displaying the operation screen 80c, the smartphone 1 displays the image arranged in the left side on the image list in the monitor area. When a tap performed on the slide show icon 83 is detected while displaying the operation screen 80c, the smartphone 1 successively displays images included in the image list in the monitor area. When a tap performed on the right arrow icon 85 is detected while displaying the operation screen 80c, the smartphone 1 displays the image arranged in the right side on the image list in the monitor area.

FIG. 20 is a flowchart illustrating another example of the procedure for the control executed in the locked state in which the lock screen 60a in FIG. 10 to FIG. 12 and in FIG. 16 to FIG. 19 is displayed. FIG. 20 depicts another example of the procedure executed when the detected gesture is the pinch-in gesture performed for the application icon, that is, executed after it is determined as Yes at Step S44 of FIG. 14. The procedure in FIG. 20 is implemented by the controller 10 executing the control program 9A.

When it is determined as Yes at Step S44, then at Step S45, the controller 10 detects a direction of the detected pinch-in gesture, and at Step S46, performs the unlock process. At Step S49, the controller 10 executes a specific function of the application corresponding to the direction of the pinch-in gesture detected at Step S45. At Step S51, the controller 10 displays the operation screen for executing the function of the executed application on the touch screen display 2. For example, as illustrated in FIG. 17 to FIG. 19, the controller 10 displays any one of the operation screens 80a to 80c for executing any one of the camera function, the video function, and the photo-album function, on the touch screen display 2, among the functions of the camera application each of which is associated with a direction of the pinch-in gesture. Thereafter, the controller 10 ends the present process.

As illustrated in FIG. 20, the smartphone 1 changes the function executed by an application associated with an application icon according to a direction in which at least one of the first touch and the second touch with respect to the application icon moves closer to the other. For example, when detecting a pinch-in gesture performed for the application icon associated with the camera application, the controller 10 can execute the camera function, the video function, or the photo-album function included in the camera application according to the direction of the pinch-in gesture. Thus, the user can display an operation screen for executing a specific function of a desired application with a simple operation by changing the direction of the pinch-in gesture performed for the application icon displayed on the lock screen according to any function that the user wishes to execute. That is, the user can execute a set predetermined process without inputting a gesture to select a desired function after the execution of the application, by changing the direction of the pinch-in gesture performed for the application icon displayed on the lock screen according to any function that the user wishes to execute.

The smartphone 1 has been explained using the pinch-in gesture as an example of the specific gesture performed for the application icon during the processing operations illustrated in FIG. 16 to FIG. 20. However, the specific gesture performed for the padlock icon and for the application icon may be the pinch-out gesture as illustrated in FIG. 8.

The example in which the smartphone 1 changes the function executed by a target application according to the direction of the pinch-in gesture or the pinch-out gesture performed for the application icon during the processing operations illustrated in FIG. 16 to FIG. 20 has been explained. However, the function executed by a target application may be changed to another according to a type of gesture performed for the padlock icon and for the application icon. For example, when detecting a pinch-in gesture or a pinch-out gesture performed for a desired application icon after the padlock icon is tapped, the smartphone 1 may change the function executed by the target application to another according to the number of taps on the padlock icon.

For example, when detecting a pinch-in gesture or a pinch-out gesture performed for the application icon 68a associated with the camera application after the user performs a single tap on the padlock icon, the smartphone 1 displays an operation screen for executing the video function. When detecting a pinch-in gesture or a pinch-out gesture performed for the application icon 68a associated with the camera application after the user performs a double tap on the padlock icon, the smartphone 1 displays an operation screen for executing the photo-album function. In this case, when detecting a pinch-in gesture or a pinch-out gesture performed for the application icon 68a without a tap on the padlock icon, the smartphone 1 displays the operation screen for executing the camera function.

The embodiment has explained the example in which when detecting a pinch-in gesture or a pinch-out gesture performed for an application icon, the smartphone 1 performs the unlock process and executes a corresponding application; however, the embodiment is not limited thereto. The smartphone 1 may be configured to change the process to be executed depending upon whether the pinch-in gesture is detected or the pinch-out gesture is detected. For example, when the pinch-in gesture is detected, as illustrated at Steps S46 to S50 in FIG. 14, the smartphone 1 may perform the unlock process and execute the corresponding application. When the pinch-out gesture is detected, as illustrated at Steps S48 to S64 in FIG. 15, the smartphone 1 may execute the corresponding application and then execute the process for returning to the lock screen.

The embodiment disclosed in the present application can be modified without departing the gist and the scope of the invention. Moreover, the embodiments and their modifications disclosed in the present application can be combined with each other if necessary. For example, the embodiment may be modified as follows.

For example, the programs illustrated in FIG. 5 may be divided into a plurality of modules, or may be combined with any other program.

In the embodiment, the smartphone has been explained as an example of the device provided with the touch screen; however, the device according to the appended claims is not limited to the smartphone. The device according to the appended claims may be a mobile electronic device other than the smartphone. Examples of the mobile electronic devices include, but are not limited to, mobile phones, tablets, mobile personal computers, digital cameras, media players, electronic book readers, navigators, and gaming devices. The device according to the appended claims may be a stationary-type electronic device. Examples of the stationary-type electronic devices include, but are not limited to, desktop personal computers, automatic teller machines (ATM), and television receivers.

Although the art of appended claims has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A device, comprising:
a touch screen display configured to display
a lock screen in a locked state, and
another screen in an unlocked state; and
a controller configured to,
when a multi-touch gesture comprising a first touch and a second touch on the touch screen display and changing a distance between the first touch and the second touch is detected during display of the lock screen in the locked state,
release the locked state and change from said locked state to the unlocked state, wherein the controller is configured to perform a continuous change from the locked state to the unlocked state without stopping said change,
wherein
the touch screen display is configured to display an object arranged on the lock screen, the object being associated with an application,
the multi-touch gesture is a gesture to move at least one of the first touch and the second touch closer to a position where the object is arranged is detected, and
when the multi-touch gesture is detected, the controller is configured to release the locked state to execute the application associated with the object.

2. The device according to claim 1, wherein
the multi-touch gesture is a gesture in which at least one of (i) a distance between the first touch and the position where the object is arranged and (ii) a distance between the second touch and the position where the object is arranged is changed to a distance shorter than a threshold.

3. The device according to claim 1, wherein
the controller is configured to, during said multi-touch gesture,
in response to a first direction in which at least one of the first touch and the second touch moves with respect to the object and closer to the other of the first touch and the second touch,
execute a first function of the application associated with the object, and
in response to a second direction in which at least one of the first touch and the second touch moves with respect to the object and closer to the other of the first touch and the second touch,
execute a second function of the application associated with the object, the first direction is different from the second direction, and
the first function is different from the second function.

4. A device, comprising:
a touch screen display configured to display
  a lock screen in a locked state, and
  another screen in an unlocked state; and
a controller configured to,
  when a multi-touch gesture comprising a first touch and a second touch on the touch screen display and changing a distance between the first touch and the second touch is detected during display of the lock screen in the locked state,
    release the locked state and change from said locked state to the unlocked state, wherein the controller is configured to perform a continuous change from the locked state to the unlocked state without stopping said change,
wherein
the touch screen display is configured to display an object arranged on the lock screen, the object being associated with an application,
the multi-touch gesture is a gesture to move at least one of the first touch and the second touch away from the other and further away from a position where the object is arranged is detected, and
when the multi-touch gesture is detected, the controller is configured to release the locked state to execute the application associated with the object.

5. The device according to claim 4, wherein
the multi-touch gesture is a gesture in which at least one of (i) a distance between the first touch and the position where the object is arranged and (ii) a distance between the second touch and the position where the object is arranged is changed to a distance longer than a threshold.

6. The device according to claim 4, wherein
the controller is configured to, during said multi-touch gesture,
  in response to a first direction in which at least one of the first touch and the second touch moves with respect to the object and further away from the other of the first touch and the second touch,
    execute a first function of the application associated with the object, and
  in response to a second direction in which at least one of the first touch and the second touch moves with respect to the object and further away from the other of the first touch and the second touch,
    execute a second function of the application associated with the object,
the first direction is different from the second direction, and
the first function is different from the second function.

7. A method of controlling a device with a touch screen display, the method comprising:
  displaying, on the touch screen display,
    a lock screen in a locked state, and
    another screen in an unlocked state;
  detecting a multi-touch gesture, which comprises a first touch and a second touch on the touch screen display and changes a distance between the first touch and the second touch, during display of the lock screen in the locked state; and
  upon the detecting the multi-touch gesture, releasing the locked state and performing a continuous change from said locked state to the unlocked state without stopping said change,
wherein
the touch screen display displays an object arranged on the lock screen, the object being associated with an application,
the multi-touch gesture is a gesture to move at least one of the first touch and the second touch closer to a position where the object is arranged is detected, and
when the multi-touch gesture is detected, said releasing the locked state is performed and the application associated with the object is executed.

8. A non-transitory storage medium that stores a program for causing, when executed by a device with a touch screen display, the device to execute:
  displaying, on the touch screen display,
    a lock screen in a locked state, and
    another screen in an unlocked state;
  detecting a multi-touch gesture, which comprises a first touch and a second touch on the touch screen display and changes a distance between the first touch and the second touch, during display of the lock screen in the locked state; and
  upon the detecting the multi-touch gesture, releasing the locked state and performing a continuous change from said locked state to the unlocked state without stopping said change,
wherein
the touch screen display displays an object arranged on the lock screen, the object being associated with an application,
the multi-touch gesture is a gesture to move at least one of the first touch and the second touch closer to a position where the object is arranged is detected, and
when the multi-touch gesture is detected, said releasing the locked state is performed and the application associated with the object is executed.

9. The device according to claim 1, wherein the controller is configured to release the locked state in response to the detected multi-touch gesture and without further user operation on the touch screen display.

10. The method according to claim 7, wherein the detected multi-touch gesture alone is sufficient to cause said releasing the locked state.

11. The device according to claim 1, wherein
the device has no other state during the continuous change between
  the locked state in which gestures other than the multi-touch gesture and a predetermined gesture are not accepted through the touch screen display, and
  the unlocked state in which another screen is displayed.

12. The device according to claim 1, wherein the multi-touch gesture includes the first touch and the second touch in a same time domain.

13. A method of controlling a device with a touch screen display, the method comprising:
  displaying, on the touch screen display,
    a lock screen in a locked state, and
    another screen in an unlocked state;
  detecting a multi-touch gesture, which comprises a first touch and a second touch on the touch screen display and changes a distance between the first touch and the second touch, during display of the lock screen in the locked state; and
  upon the detecting the multi-touch gesture, releasing the locked state and performing a continuous change from said locked state to the unlocked state without stopping said change, wherein
the touch screen display displays an object arranged on the lock screen, the object being associated with an application,
the multi-touch gesture is a gesture to move at least one of the first touch and the second touch away from the other and further away from a position where the object is arranged is detected, and
when the multi-touch gesture is detected, said releasing the locked state is performed and the application associated with the object is executed.

14. A non-transitory storage medium that stores a program for causing, when executed by a device with a touch screen display, the device to execute:
displaying, on the touch screen display,
a lock screen in a locked state, and
another screen in an unlocked state;
detecting a multi-touch gesture, which comprises a first touch and a second touch on the touch screen display and changes a distance between the first touch and the second touch, during display of the lock screen in the locked state; and
upon the detecting the multi-touch gesture, releasing the locked state and performing a continuous change from said locked state to the unlocked state without stopping said change,
wherein
the touch screen display displays an object arranged on the lock screen, the object being associated with an application,
the multi-touch gesture is a gesture to move at least one of the first touch and the second touch away from the other and further away from a position where the object is arranged is detected, and
when the multi-touch gesture is detected, said releasing the locked state is performed and the application associated with the object is executed.

* * * * *